US011413567B2

(12) United States Patent
Johnson

(10) Patent No.: US 11,413,567 B2
(45) Date of Patent: Aug. 16, 2022

(54) APPARATUS AND SYSTEM FOR SWING ADSORPTION PROCESSES

(71) Applicant: Robert A. Johnson, Doylestown, PA (US)

(72) Inventor: Robert A. Johnson, Doylestown, PA (US)

(73) Assignee: ExxonMobil Upstream Research Company, Spring, TX (US)

( * ) Notice: Subject to any disclaimer, the term of this patent is extended or adjusted under 35 U.S.C. 154(b) by 478 days.

(21) Appl. No.: 16/263,940

(22) Filed: Jan. 31, 2019

(65) Prior Publication Data

US 2019/0262764 A1    Aug. 29, 2019

Related U.S. Application Data

(60) Provisional application No. 62/636,452, filed on Feb. 28, 2018.

(51) Int. Cl.
*B01D 53/04* (2006.01)
*B01D 53/14* (2006.01)
(Continued)

(52) U.S. Cl.
CPC ....... *B01D 53/0407* (2013.01); *B01D 53/047* (2013.01); *B01D 53/0462* (2013.01); *B01D 53/0473* (2013.01); *B01D 53/1462* (2013.01); *B01D 53/1475* (2013.01); *B01D 53/261* (2013.01); *B01D 2253/104* (2013.01); *B01D 2253/108* (2013.01); *B01D 2256/245* (2013.01); *B01D 2257/40* (2013.01);
(Continued)

(58) Field of Classification Search
CPC .. B01D 53/04; B01D 53/047; B01D 53/0407; B01D 53/0462; B01D 53/0473; B01D 53/1462; B01D 53/261
See application file for complete search history.

(56) References Cited

U.S. PATENT DOCUMENTS 1,868,138 A    7/1932  Fisk
3,103,425 A    9/1963  Meyer
(Continued)

FOREIGN PATENT DOCUMENTS

EP    0257493    2/1988
EP    0426937    5/1991
(Continued)

OTHER PUBLICATIONS

Jain et al. (Heuristic design of pressure swing adsorption: A preliminary study, 2003, Separation and purification technology, vol. 33 , pp. 25-43) (Year: 2003).*
(Continued)

*Primary Examiner* — Youngsul Jeong
(74) *Attorney, Agent, or Firm* — ExxonMobil Upstream Research Company—Law Department

(57) ABSTRACT

Provided are apparatus and systems for performing a swing adsorption process. This swing adsorption process may involve performing modeling to generate a swing adsorption system to manage a feed stream to produce a product stream within specification. The process may be utilized for swing adsorption processes, such as TSA and/or PSA, which are utilized to remove one or more contaminants from a gaseous feed stream.

12 Claims, 6 Drawing Sheets

(51) Int. Cl.
*B01D 53/047* (2006.01)
*B01D 53/26* (2006.01)
*F25J 3/02* (2006.01)

(52) U.S. Cl.
CPC .... B01D 2257/504 (2013.01); B01D 2257/80 (2013.01); B01D 2259/40013 (2013.01); B01D 2259/40043 (2013.01); F25J 3/0233 (2013.01)

(56) References Cited

U.S. PATENT DOCUMENTS

| | | |
|---|---|---|
| 3,124,152 A | 3/1964 | Payne |
| 3,142,547 A | 7/1964 | Marsh et al. |
| 3,508,758 A | 4/1970 | Strub |
| 3,594,983 A | 7/1971 | Yearout |
| 3,602,247 A | 8/1971 | Bunn et al. |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher |
| 4,340,398 A | 7/1982 | Doshi et al. |
| 4,386,947 A | 6/1983 | Mizuno et al. |
| 4,421,531 A | 12/1983 | Dalton, Jr. et al. |
| 4,445,441 A | 5/1984 | Tanca |
| 4,461,630 A | 7/1984 | Cassidy et al. |
| 4,496,376 A | 1/1985 | Hradek |
| 4,631,073 A | 12/1986 | Null et al. |
| 4,693,730 A | 9/1987 | Miller et al. |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |
| 4,790,272 A | 12/1988 | Woolenweber |
| 4,814,146 A | 3/1989 | Brand et al. |
| 4,816,039 A | 3/1989 | Krishnamurthy et al. |
| 4,877,429 A | 10/1989 | Hunter |
| 4,977,745 A | 12/1990 | Heichberger |
| 5,110,328 A | 5/1992 | Yokota et al. |
| 5,125,934 A | 6/1992 | Krishnamurthy et al. |
| 5,169,006 A | 12/1992 | Stelzer |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,354,346 A | 10/1994 | Kumar |
| 5,365,011 A | 11/1994 | Ramachandran et al. |
| 5,370,728 A | 12/1994 | LaSala et al. |
| 5,486,227 A | 1/1996 | Kumar et al. |
| 5,547,641 A | 8/1996 | Smith et al. |
| 5,565,018 A | 10/1996 | Baksh et al. |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,779,768 A | 7/1998 | Anand et al. |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,882,380 A | 3/1999 | Sircar |
| 5,906,673 A | 5/1999 | Reinhold, III et al. |
| 5,912,426 A | 6/1999 | Smolarek. et al. |
| 5,914,294 A | 6/1999 | Park et al. |
| 5,924,307 A | 7/1999 | Nenov |
| 5,935,444 A | 8/1999 | Johnson et al. |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg |
| 6,099,621 A | 8/2000 | Ho |
| 6,102,985 A | 8/2000 | Naheiri et al. |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,444,610 B1 | 9/2002 | Yamamoto |
| 6,451,095 B1 | 9/2002 | Keefer et al. |
| 6,457,485 B2 | 10/2002 | Hill et al. |
| 6,458,187 B1 | 10/2002 | Fritz et al. |
| 6,464,761 B1 | 10/2002 | Bugli |
| 6,471,749 B1 | 10/2002 | Kawai et al. |
| 6,471,939 B1 | 10/2002 | Boix et al. |
| 6,488,747 B1 | 12/2002 | Keefer |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez-Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Keefer et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |

(56) References Cited

U.S. PATENT DOCUMENTS

| | | |
|---|---|---|
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,243,679 B2 | 7/2007 | Thelen |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,449,649 B2 | 5/2013 | Greenough |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |
| 8,715,617 B2 | 5/2014 | Genkin et al. |
| 8,752,390 B2 | 6/2014 | Wright et al. |
| 8,753,428 B2 | 6/2014 | Lomax, Jr. et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |
| 8,790,618 B2 | 7/2014 | Adams et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,939,014 B2 | 1/2015 | Kamakoti et al. |
| 9,005,561 B2 | 4/2015 | Leta |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 * | 5/2015 | Deckman ............ B01D 53/047 95/96 |
| 9,050,553 B2 | 6/2015 | Alizadeh-Khiavi et al. |
| 9,067,168 B2 | 6/2015 | Frederick et al. |
| 9,067,169 B2 | 6/2015 | Patel |
| 9,095,809 B2 | 8/2015 | Deckman et al. |
| 9,108,145 B2 | 8/2015 | Kalbassi et al. |
| 9,120,049 B2 | 9/2015 | Sundaram et al. |

(56) References Cited

U.S. PATENT DOCUMENTS

| | | |
|---|---|---|
| 9,126,138 B2 | 9/2015 | Deckman et al. |
| 9,162,175 B2 | 10/2015 | Sundaram |
| 9,168,483 B2 | 10/2015 | Ravikovitch et al. |
| 9,168,485 B2 | 10/2015 | Deckman et al. |
| 9,272,264 B2 | 3/2016 | Coupland |
| 9,278,338 B2 | 3/2016 | Coupland |
| 9,358,493 B2 | 6/2016 | Tammera et al. |
| 9,573,116 B2 | 2/2017 | Johnson et al. |
| 9,597,655 B2 | 3/2017 | Beeckman |
| 9,737,846 B2 | 8/2017 | Carstensen et al. |
| 9,744,521 B2 | 8/2017 | Brody et al. |
| 10,040,022 B2 | 8/2018 | Fowler et al. |
| 10,080,991 B2 | 9/2018 | Johnson et al. |
| 10,080,992 B2 | 9/2018 | Nagavarapu et al. |
| 10,124,286 B2 | 11/2018 | McMahon et al. |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret et al. |
| 2003/0170527 A1 | 9/2003 | Finn et al. |
| 2003/0188635 A1 | 10/2003 | Lomax, Jr. et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0045041 A1 | 3/2005 | Hechinger et al. |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0014511 A1 | 7/2005 | Keefer et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0116430 A1 | 6/2006 | Wentink et al. |
| 2006/0116460 A1 | 6/2006 | Georget et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0202336 A1 | 8/2008 | Hofer et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024150 A1 | 2/2012 | Moniot |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0272823 A1 | 11/2012 | Halder et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0095996 A1 | 4/2013 | Buelow et al. |
| 2013/0225898 A1 | 8/2013 | Sundaram et al. |
| 2014/0013955 A1 | 1/2014 | Tammera et al. |
| 2014/0060326 A1 | 3/2014 | Sundaram et al. |
| 2014/0157984 A1 | 6/2014 | Deckman et al. |
| 2014/0157986 A1 | 6/2014 | Ravikovitch et al. |
| 2014/0208797 A1 | 7/2014 | Kelley et al. |
| 2014/0216254 A1 | 8/2014 | Tammera et al. |
| 2015/0013377 A1 | 1/2015 | Oelfke |
| 2015/0068397 A1 | 3/2015 | Boulet et al. |
| 2015/0101483 A1 | 4/2015 | Perry et al. |
| 2015/0196870 A1 | 7/2015 | Albright et al. |
| 2015/0328578 A1 | 11/2015 | Deckman et al. |
| 2016/0023155 A1 | 1/2016 | Ramkumar et al. |
| 2016/0129433 A1 | 5/2016 | Tammera et al. |
| 2016/0166972 A1 | 6/2016 | Owens et al. |
| 2016/0236135 A1 | 8/2016 | Tammera et al. |
| 2016/0332105 A1 | 11/2016 | Tammera et al. |
| 2016/0332106 A1 | 11/2016 | Tammera et al. |
| 2017/0056814 A1 | 3/2017 | Marshall et al. |
| 2017/0113173 A1 | 4/2017 | Fowler et al. |
| 2017/0113175 A1 | 4/2017 | Fowler et al. |
| 2017/0136405 A1 | 5/2017 | Ravikovitch et al. |
| 2017/0266604 A1 | 9/2017 | Tammera et al. |
| 2017/0282114 A1 | 10/2017 | Owens et al. |
| 2017/0341011 A1 | 11/2017 | Nagavarapu et al. |
| 2017/0341012 A1 | 11/2017 | Nagavarapu et al. |

(56) References Cited

U.S. PATENT DOCUMENTS

| | | |
|---|---|---|
| 2018/0001301 A1 | 1/2018 | Brody et al. |
| 2018/0056229 A1 | 3/2018 | Denton et al. |
| 2018/0056235 A1 | 3/2018 | Wang et al. |
| 2018/0169565 A1 | 6/2018 | Brody et al. |
| 2018/0169617 A1 | 6/2018 | Brody et al. |
| 2018/0339263 A1 | 11/2018 | Dehaas et al. |

FOREIGN PATENT DOCUMENTS

| | | |
|---|---|---|
| EP | 0904827 | 3/1999 |
| EP | 1674555 | 6/2006 |
| EP | 2823872 | 1/2015 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 06006736 | 6/1992 |
| JP | 3477280 | 8/1995 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| KR | 101349424 | 1/2014 |
| WO | WO2002/024309 | 3/2002 |
| WO | WO2002/073728 | 9/2002 |
| WO | WO2005/090793 | 9/2005 |
| WO | WO2010/024643 | 3/2010 |
| WO | WO2011/139894 | 11/2011 |

OTHER PUBLICATIONS

Dubbeldam, D., et al., (2013) "On the inner workings of Monte Carlo codes" *Molecular Simulation*, vol. 39, Nos. 14-15, pp. 1253-1292.

Earl, D. J. et al., (2005) "Parallel tempering: Theory, applications, and new perspectives," *Phys Chem Chem Phys*, vol. 7, pp. 3910-3916.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Fang, H. et al., (2013) "First principles derived, transferable force fields for CO2 adsorption in Na-exchanged cationic zeolites," *Phys Chem Chem Phys*, vol. 15, pp. 12882-12894.

Fang, H., et al., (2012) "Prediction of CO2 Adsorption Properties in Zeolites Using Force Fields Derived from Periodic Dispersion-Corrected DFT Calculations," *J Phys Chem C*, 10692, 116, ACS Publications.

Farooq, S. et al. (1990) "Continuous Countercurrent Flow Model for a Bulk PSA Separation Process," *AIChE J.*, v36 (2) p. 310-314.

FlowServe (2005) "Exceeding Expectations, US Navy Cuts Maintenance Costs With Flowserve GX-200 Non-Contacting Seal Retrofits," *Face-to-Face*, v17.1, 8 pgs.

Foster, M.D., et al. "A geometric solution to the largest-free-sphere problem in zeolite frameworks", *Microporous and Mesoporous Materials*, vol. 90, pp. 32-38.

Frenkel, D. et al., (2002) "Understanding Molecular Simulation: From Algorithms to Applications", 2nd ed., *Academic Press*, pp. 292-301.

Garcia, E. J., et al. (2014) "Tuning the Adsorption Properties of Zeolites as Adsorbents for CO2 Separation: Best Compromise between the Working Capacity and Selectivity", *Ind. Eng. Chem. Res.*, vol. 53, pp. 9860-9874.

GE Oil & Gas (2007) "Dry Gas Seal Retrofit," Florene, Italy, www.ge.com/oilandgas, 4 pgs.

Harris, J. G. et al., (1995) "Carbon Dioxide's Liquid-Vapor Coexistence Curve and Critical Properties as Predicted by a Simple Molecular Model", *J Phys Chem*, vol. 99, p. 12021-12024.

Hill, J. R. et al., (1995) "Molecular Mechanics Potential for Silica and Zeolite Catalysts Based on ab Initio Calculations. 2. Aluminosilicates", *J Phys Chem*, vol. 99, pp. 9536-9550.

Hopper, B. et al. (2008) "World's First 10,000 psi Sour Gas Injection Compressor," *Proceedings of the 37$^{th}$ Turbomachinery Symposium*, pp. 73-95.

Jain, S., et al. (2003) "Heuristic design of pressure swing adsorption: a preliminary study", *Separation and Purification Technology*, vol. 33, pp. 25-43.

Kim J. et al. (2012) "Predicting Large CO2 Adsorption in Aluminosilicate Zeolites for Postcombustion Carbon Dioxide Capture", *J. Am. Chem, Soc.*, vol. 134, pp. 18940-18940.

Kärger, J., et al.(2012) "Diffusion in Nanoporous Materials" , Whiley-VCH publisher, vol. 1, Chapter 16, pp. 483-501.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Lin, L., et al. (2012) "In silico screening of carbon-capture materials", *Nature Materials*, vol. 1, pp. 633-641.

Liu, Q. et al., (2010) "NaKA sorbents with high $CO_2$-over-$N_2$ selectivity and high capacity to adsorb $CO_2$," *Chem Commun*, , vol. 46, pp. 4502-4504.

Lowenstein, W., (1954) "The Distribution of Aluminum in the Tetra-Hedra of Silicates and Aluminates" Am Mineral, 92-96.

Neimark, A. V. et al., (1997) "Calibration of Pore Volume in Adsorption Experiments and Theoretical Models", *Langmuir*, vol. 13, pp. 5148-5160.

Palomino, M., et al. (2009) "New Insights on CO2-Methane Seapration Using LTA Zeolites with Different Si/Al Ratios and a First Comparison with MOFs", Langmar, vol. 26(3), pp. 1910-1917.

Patcas, F.C. et al.(2007) "CO Oxidation Over Structured Carriers: A Comparison of Ceramic Forms, Honeycombs and Beads", *Chem Engineering Science*, v. 62, pp. 3984-3990.

Peng, D. Y., et al., (1976) "A New Two-Constant Equation of State", *Ind Eng Chem Fundam*, vol. 15, pp. 59-64.

Pham, T. D. et al., (2013) "Carbon Dioxide and Nitrogen Adsorption on Cation-Exchanged SSZ-13 Zeolites", *Langmuir*, vol. 29, pp. 832-839.

Pophale, R., et al., (2011) "A database of new zeolite-like materials", *Phys Chem Chem Phys*, vol. 13(27), pp. 12407-12412.

Potoff, J. J. et al., (2001) "Vapor-Liquid Equilibria of Mixtures Containing Alkanes. Carbon Dioxide, and Nitrogen", AIChE J, vol. 47(7), pp. 1676-1682.

Rameshni, Mahin "Strategies for Sour Gas Field Developments," *Worley Parsons—Brochure*, 20 pp.

Reyes, S. C. et al. (1997) "Frequency Modulation Methods for Diffusion and Adsorption Measurements in Porous Solids," *J. Phys. Chem. B*. v101, pp. 614-622.

Rezaei, F. et al. (2009) "Optimum Structured Adsorbents for Gas Separation Process", *Chem. Engineering Science*, v. 64, pp. 5182-5191.

Richardson, J.T. et al. (2000) "Properties of Ceramic Foam Catalyst Supports: Pressure Dop", *Applied Catalysis A: General* v. 204, pp. 19-32.

Robinson, D. B., et al., (1985) "The development of the Peng-Robinson Equation and its Application to Phase Equilibrium in a System Containing Methanol," *Fluid Phase Equilibria*, vol. 24, pp. 25-41.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Reliability in Centrifugal Compressors," *Dresser-Rand, Tech. Paper 134*, 15 pages.

Santos, M. S (2011) "New Cycle configuration to enhance performance of kinetic PSA processes" Chemical Engineering Science 66, pp. 1590-1599.

Snurr, R. Q. et al. (1993) "Prediction of Adsorption of Aromatic Hydrocarbons in Silicalite from Grand Canonical Monte Carlo Simulations with Biased Insertions", *J Phys Chem*, vol. 97, pp. 13742-13752.

(56) References Cited

OTHER PUBLICATIONS

Stemmet, C.P. et al. (2006) "Solid Foam Packings for Multiphase Reactors: Modelling of Liquid Holdup and Mass Transfer", *Chem. Engineering Research and Design*, v. 84(A12), pp. 1134-1141.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

Talu, O. et al., (2001), "Reference potentials for adsorption of helium, argon, methane, and krypton in high-silica zeolites," *Colloids and Surfaces A: Physicochemical and Engineering Aspects*, vol. 83-93, pp. 83-93.

Walton, K. S. et al., (2006) "$CO_2$ adsorption in Y and X zeolites modified by alkali metal cation exchange," *Microporous and Mesoporous Mat*, vol. 91, pp. 78-84.

Willems, T. F. et al., (2012) "Algorithms and tools for high-throughput geometry-based analysis of crystalline porous materials" *Microporous Mesoporous Mat*, vol. 149, pp. 134-141.

Zukal, A., et al., (2009) "Isosteric heats of adsorption of carbon dioxide on zeolite MCM-22 modified by alkali metal cations", *Adsorption*, vol. 15, pp. 264-270.

U.S. Appl. No. 16/252,975, filed Jan. 21, 2019, Krishna Nagavarapu et al.

U.S. Appl. No. 16/258,266, filed Jan. 25, 2019, Barnes et al.

U.S. Appl. No. 16/263,940, filed Jan. 31, 2019, Johnson.

U.S. Appl. No. 62/783,766, filed Dec. 21, 2019, Fulton et al.

Allen, M. P. et al., (1987) "Computer Simulation of Liquids" Clarendon Press, pp. 156-160.

Asgari, M. et al., (2014) "Designing A Commercial Scale Pressure Swing Adsorber For Hydrogen Purification" *Petroleum & Coal*, vol. 56(5), pp. 552-561.

Baerlocher, C. et al., (2017) International Zeolite Association's "Database of Zeolite Structures," available at http://www.iza-structure.org/databases/, downloaded Jun. 15, 2018, 1 page.

Burtch, N.C. et al., (2015) "Molecular-level Insight into Unusual Low Pressure $CO_2$ Affinity in Pillared Metal-Organic Frameworks," *J Am Chem Soc*, 135, pp. 7172-7180.

Beauvais, C. et al., (2004) "Distribution of Sodium Cations in Faujasite-Type Zeolite: A Canonical Parallel Tempering Simulation Study," *J Phys Chem B*, 108, pp. 399-404.

Cheung, O. et al., (2013) "Adsorption kinetics for $CO_2$ on highly selective zeolites NaKA and nano-NaKA," *Appl Energ*, 112, pp. 1326-1336.

Cygan, R. T. et al., (2004) "Molecular Models of Hydroxide, Oxyhydroxide, and Clay Phases and the Development of a General Force Field", *J Phys Chem B*, vol. 108, pp. 1255-1266.

Deem, M. W. et al., (2009) "Computational Discovery of New Zeolite-Like Materials", *J Phys Chem C*, 113, pp. 21353-21360.

Demiralp, E., et al., (1999) "Morse Stretch Potential Charge Equilibrium Force Field for Ceramics: Application to the Quartz-Stishovite Phase Transition and to Silica Glass", *Physical Review Letters*, vol. 82(8), pp. 1708-1711.

Dubbeldam, D. et al. (2016) "RASPA: molecular simulation software for adsorption and diffusion in flexible nanoporous materials" *Molecular Simulation*, (published online Feb. 26, 2015), vol. 42(2), pp. 81-101.

\* cited by examiner

APPARATUS AND SYSTEM FOR SWING ADSORPTION PROCESSES

CROSS-REFERENCE TO RELATED APPLICATION

This application claims the benefit of U.S. Provisional Patent Application 62/636,452 filed 28 Feb. 2018 entitled APPARATUS AND SYSTEM FOR SWING ADSORPTION PROCESSES, the entirety of which is incorporated by reference herein.

FIELD

The present techniques relate to a method and system associated with swing adsorption processes used in conditioning streams for downstream processing. In particular, the method and system involves generating a swing adsorption processes and performing swing adsorption processes to condition the streams within acceptable limits for a downstream process.

BACKGROUND

Gas separation is useful in many industries and can typically be accomplished by flowing a mixture of gases over an adsorbent material that preferentially adsorbs one or more gas components while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle temperature swing adsorption (RCTSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and/or TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated by reducing the pressure, thereby releasing the adsorbed carbon dioxide. Then, the adsorbent material is typically purged and repressurized prior to starting another adsorption cycle.

The swing adsorption processes typically involve adsorbent bed units, which include adsorbent beds disposed within a housing and configured to maintain fluids at various pressures for different steps in a cycle within the unit. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic forms or the like.

Further, various adsorbent bed units may be coupled together with conduits and valves to manage the flow of fluids through the cycle. Orchestrating these adsorbent bed units involves coordinating the steps in the cycle for each of the adsorbent bed units with other adsorbent bed units in the system. A complete cycle can vary from seconds to minutes as it transfers a plurality of gaseous streams through one or more of the adsorbent bed units.

A challenge with rapid cycle processes is creating and designing the transition of streams through the adsorbent beds within a swing adsorbent system between the various steps in a cycle. These streams in the swing adsorbent processes may include one or more contaminants. For example, U.S. Pat. No. 7,645,324 describe forming tortuosity paths, but fails to consider other parameters to manage the separation processes.

Accordingly, there remains a need in the industry for apparatus, methods, and systems that provide enhancements to creation of swing adsorbent systems associated with hydrocarbon recovery processes. In particular, a need exists for enhancements to creation of swing adsorption systems in rapid cycle swing adsorption processes.

SUMMARY OF THE INVENTION

In one embodiment, a method for fabricating a swing adsorption system to perform a swing adsorption process is described. The method comprising: identifying one or more contaminants to be removed from a swing adsorption process; identifying a feed contaminant range for a feed stream to the swing adsorption process; identifying a product contaminant threshold for a product stream from the swing adsorption process; identifying a range of flow rates for the feed stream passing through the swing adsorption process; determining an adsorbent bed configuration for each of the adsorbent bed units in the swing adsorption system, wherein the adsorbent bed configuration is configured to provide a sharp adsorption front during the swing adsorption process; generating a swing adsorption configuration based on the identified one or more contaminants, the range of flow rates and/or the determined adsorbent bed configuration, wherein the swing adsorption system comprises a plurality of adsorbent bed units, wherein each of the plurality of adsorbent bed units comprise an adsorbent bed structure that has a plurality of channels passing through an adsorbent material; and fabricating the swing adsorption system based on the swing adsorption configuration.

In one or more embodiments, the method may include various enhancements. The enhancements may include determining the adsorbent bed configuration comprises modeling the adsorbent bed based on i) a range of adsorbent porosities, ii) a range of adsorption isotherms for the adsorbent material, and iii) a range of channel geometries; determining whether the adsorbent bed configuration is configured to provide a sharp adsorption front comprises: calculating a ratio of an adsorption rate into the adsorbent layer to a convection rate along one of the plurality of the channels, and determining that the adsorption front is a sharp adsorption front when the ratio is greater than or equal to 1; wherein calculating a ratio of an adsorption rate into the adsorbent layer to a convection rate along one of the plurality of the channels comprises solving the following equation: $Da = Ni/Ji$, wherein $Da$ is the Damkohler number, Ni is the total molar adsorption rate of species i and Ji is the total molar flow rate through the channels of species I; wherein determining the range of adsorbent porosities further comprises: determining a porosity of the adsorbent material, determining a porosity of a binder material, determining a porosity of a remaining material, and combining the porosity of the adsorbent material, the porosity of a binder material and the porosity of a remaining material to form the range of adsorbent porosities; wherein a combination of material forms a mixed matrix adsorbent layer with three distinct porous regions: the micropores within the zeolite crystal, the mesopores within the binder material that surrounds the zeolite crystals and the macropores that fill the remaining space in the layer; further comprising determining thickness of the adsorbent material based on a bed structure and an adsorbent layer formulation; wherein the bed structure comprises length of the adsorbent bed, diameter of the adsorbent bed, volume of the passages through the adsorbent bed; wherein the bed structure comprises determining a range of flow rates, and then a number of adsorbent beds required given a specific adsorbent isotherm, channel configuration and purity constraint; wherein the swing adsorption configuration comprises an adsorbent material thickness in a range between 10 microns and 100 microns, in a range between 20 microns and 80 microns, in a range between 20 microns and 50 microns; wherein the swing adsorption configuration comprises a cycle time for the swing adsorption process in a range between 10 seconds and 1,200 seconds; wherein the one or more contaminants include $H_2O$, $CO_2$, $H_2S$, $N_2$, ethane, and propane; wherein the one or more contaminants in the feed stream is $CO_2$ in a range between 5 mole percent to 60 mole percent, in a range between 5 mole percent and 30 mole percent, in a range between 5 mole percent and 20 mole percent, or in a range between 5 mole percent and 10 mole percent; and/or wherein the product contaminant threshold for a product stream is less than 50 parts per million volume of $CO_2$.

In another embodiment, a method for performing a swing adsorption process is described. The method comprising: a) performing a swing adsorption cycle, wherein the swing adsorption cycle comprises performing an adsorption step that comprises passing a feed stream through an adsorbent bed unit having an adsorbent bed to separate one or more contaminants from the feed stream to form a product stream, wherein the adsorbent bed has an adsorbent material and has a bed structure, the adsorbent bed is fabricated based on a combination of a range of porosities of the adsorbent material; a range of adsorption isotherms for the adsorbent material; and a range of channel geometries; b) determining whether the product stream satisfies a product contaminant threshold; c) if the product stream does not satisfy the product contaminant threshold, repeating steps a) to b) for at least one additional swing adsorption cycle; and d) if the product stream satisfies the product contaminant threshold; conducting away the product stream from the process.

In one or more embodiments, the method may include various enhancements. The enhancements may include wherein the cycle duration is for a period greater than 1 second and less than 600 seconds or the cycle duration is greater than 2 seconds and less than 180 seconds; wherein the gaseous feed stream is a hydrocarbon containing stream having greater than one volume percent hydrocarbons based on the total volume of the feed stream; wherein the gaseous feed stream comprises hydrocarbons and $CO_2$, wherein the $CO_2$ content is in the range of two hundred parts per million volume and less than or equal to about 2% volume of the gaseous feed stream; wherein the swing adsorption process is configured to lower the carbon dioxide ($CO_2$) level to less than 50 parts per million; comprising passing the product stream to a downstream process; wherein the downstream process is a liquefied natural gas (LNG) process that comprises an LNG process unit or is a cryogenic natural gas liquefaction (NGL) process having a NGL process unit; wherein the one or more contaminants in the feed stream is $CO_2$ in a range between 5 mole percent and 30 mole percent; and/or wherein the swing adsorption process is based on a generated swing adsorption configuration, as noted in the embodiment above.

In yet another embodiment, a cyclical swing adsorption system is described. The cyclical swing adsorption system comprises: a plurality of manifolds, wherein the plurality of manifolds comprise a feed manifold configured to pass a feed stream to the plurality of adsorbent bed units during an adsorption step, a product manifold configured to pass a product stream from the plurality of adsorbent bed units during the adsorption step, a purge manifold configured to pass a purge stream to the plurality of adsorbent bed units during a regeneration step, and a purge product manifold configured to pass a purge product stream from the plurality of adsorbent bed units during the regeneration step; a plurality of adsorbent bed units coupled to the plurality of manifolds, each of the adsorbent bed units comprising: a housing; an adsorbent material disposed within the housing and the adsorbent material forming a bed structure, wherein the adsorbent bed is fabricated based on a combination of a range of porosities of the adsorbent material; a range of adsorption isotherms for the adsorbent material; and a range of channel geometries in the bed structure; a plurality of valves, wherein at least one of the plurality of valves is associated with one of the plurality of manifolds and is configured to manage fluid flow along a flow path extending between the respective manifold and the adsorbent material.

In one or more embodiments, the cyclical swing adsorption system may include various enhancements. The enhancements may include wherein the plurality of valves comprise one or more poppet valves; wherein plurality of manifolds, the plurality of adsorbent bed units are configured to operate at pressures between 0.1 bar absolute (bara) and 100 bara; comprising a liquefied natural gas (LNG) process that comprises an LNG process unit and is configured to receive the product stream; comprising a cryogenic natural gas liquefaction (NGL) process having a NGL process unit and is configured to receive the product stream; wherein the adsorbent material disposed within the housing and the adsorbent material forming a bed structure is based on a calculated ratio of an adsorption rate into the adsorbent layer to a convection rate along one of the plurality of the channels comprises solving the following equation: $Da=N_i/J_i$, wherein Da is the Damkohler number, $N_i$ is the total molar adsorption rate of species i and $J_i$ is the total molar flow rate through the channels of species i; wherein determining the range of adsorbent porosities further comprises: determining a porosity of the adsorbent material; determining a porosity of a binder material; determining a porosity of a remaining material; and combining the porosity of the adsorbent material, the porosity of a binder material and the porosity of a remaining material to form the range of adsorbent porosities; and/or wherein the cyclical swing adsorption system, adsorption step and regeneration step are based on a swing adsorption configuration, as noted in the embodiment above.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
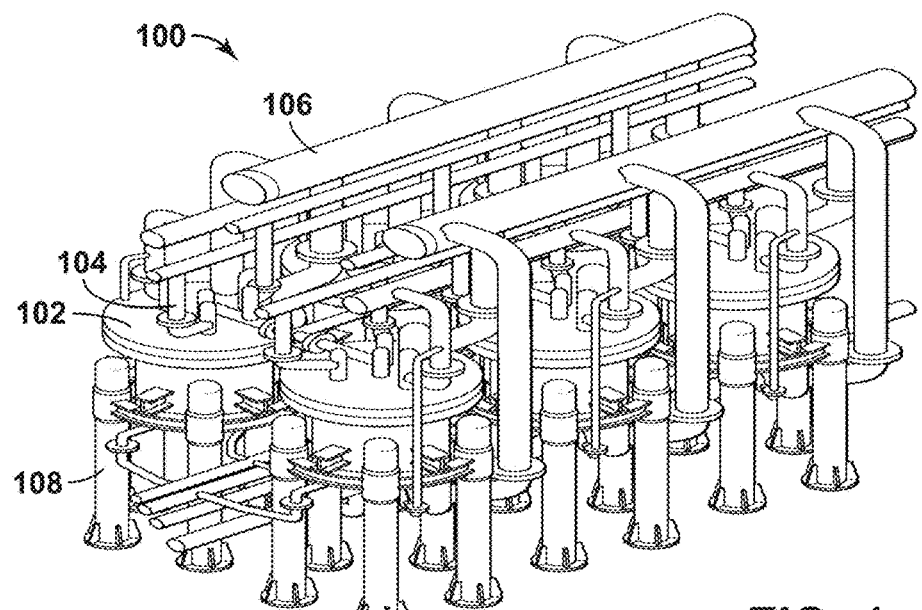
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, "conduit" refers to a tubular member forming a channel through which something is conveyed. The conduit may include one or more of a pipe, a manifold, a tube or the like.

The provided processes, apparatus, and systems of the present techniques may be used in swing adsorption processes that remove contaminants ($CO_2$, $H_2O$, and $H_2S$) from feed streams, such as hydrocarbon containing streams. As may be appreciated and as noted above, the hydrocarbon containing feed streams may have different compositions. For example, hydrocarbon feed streams vary widely in amount of acid gas, such as from several parts per million acid gas to 90 volume percent (vol. %) acid gas. Non-limiting examples of acid gas concentrations from exemplary gas reserves sources include concentrations of approximately: (a) 4 ppm $H_2S$, 2 vol. % $CO_2$, 100 ppm $H_2O$ (b) 4 ppm $H_2S$, 0.5 vol. % $CO_2$, 200 ppm $H_2O$ (c) 1 vol. % $H_2S$, 2 vol. % $CO_2$, 150 ppm $H_2O$, (d) 4 ppm $H_2S$, 2 vol. % $CO_2$, 500 ppm $H_2O$, and (e) 1 vol. % $H_2S$, 5 vol. % $CO_2$, 500 ppm $H_2O$. Further, in certain applications the hydrocarbon containing stream may include predominately hydrocarbons with specific amounts of $CO_2$ and/or water. For example, the hydrocarbon containing stream may have greater than 0.00005 volume percent $CO_2$ based on the total volume of the gaseous feed stream and less than 2 volume percent $CO_2$ based on the total volume of the gaseous feed stream; or less than 10 volume percent $CO_2$ based on the total volume of the gaseous feed stream. The processing of feed streams may be more problematic when certain specifications have to be satisfied.

The removal of contaminants may be performed by swing adsorption processes to prepare the stream for further downstream processing, such as NGL processing and/or LNG processing. For example, natural gas feed streams for liquefied natural gas (LNG) applications have stringent specifications on the $CO_2$ content to ensure against formation of solid $CO_2$ at cryogenic temperatures. The LNG specifications may involve the $CO_2$ content to be less than or equal to 50 ppm. Such specifications are not applied on natural gas streams in pipeline networks, which may involve the $CO_2$ content up to 2 vol. % based on the total volume of the gaseous feed stream. As such, for LNG facilities that use the pipeline gas (e.g., natural gas) as the raw feed, additional treating or processing steps are utilized to further purify the stream. Further, the present techniques may be used to lower the water content of the stream to less than 0.1 ppm. Exemplary swing adsorption processes and configurations may include U.S. Patent Application Publication Nos. US2017/0056814, US2017/0113175 and US2017/0113173, and U.S. Pat. Nos. 10,080,991, 10,124,286, 10,080,992 and 10,040,022, which are each incorporated by reference herein.

The present techniques provide configurations and processes that are utilized to enhance swing adsorption processes. As noted above, rapid cycle pressure and temperature swing adsorption processes may be used to remove contaminants, such as dehydrating streams and/or removing low-level $CO_2$. The present techniques may be used to model and to create swing adsorption configurations, which may include adsorbent bed configurations, such as adsorbent bed structures, necessary to achieve a high purity gas separation using rapid cycle swing adsorption processes. Similarly, the present techniques may also apply to rapid cycle thermal swing and rapid cycle pressure and thermal swing processes.

The swing adsorption configuration may be based on one or more contaminants in the feed stream, a range of flow rates and/or an adsorbent bed configuration. The swing adsorption configuration may represent a swing adsorption system that comprises two or more adsorbent bed units and associated manifolds or conduits to manage the streams through various steps in the swing adsorption process. The swing adsorption configuration may include adsorbent bed configurations for each of the adsorbent bed units, which may include an adsorbent bed structure that has a plurality of channels passing through an adsorbent material. The adsorbent bed configurations may include an adsorbent bed structure that represents a particular combination of adsorbent layer structure and adsorbent bed architecture. The adsorbent bed architecture may include multiple parallel channels that can be formed by, for example, bundles of hollow fibers, spiral wound corrugated sheets or extruded ceramic monoliths. The interior of the parallel channels may be coated with a layer containing adsorbent material, such as, for example, microporous zeolite and bound together by mesoporous material, such as colloidal silica. The combination of material forms a mixed matrix adsorbent layer with three distinct porous regions: the micropores within the zeolite crystal, the mesopores within the binder material that surrounds the zeolite crystals and the macropores that propagate through the layer.

The present techniques provided may involve computational modeling that the combination of the three porous regions in the adsorbent layer, as well as the zeolite adsorption isotherm and channel geometry may be carefully controlled to achieve a separation that yields a specific feed and product composition and desired throughput. The inability to control any one of these multiple parameters and/or features may result in an unacceptable broadening of the adsorption front that may result in a loss of purity that can compromise the separation.

The present techniques may be used to optimize the design of parallel channel adsorbent beds for use in rapid cycle swing adsorption processes. There are multiple parameters or settings that may be controlled during the design, and may be optimized to achieve a particular separation of contaminants from the feed stream. If these parameters are not managed or controlled, then the resulting separation process may not achieve the desired purity. By way of example, the tortuosity pathways through the channels in the adsorbent bed may be maintained in the range 2.5 less than (<) $\tau$ less than (<) 1 to realize significant process intensification through rapid cycle times and kinetic selectivity. The tortuosity pathways is only one of a number of parameters that describe the adsorbent bed design to provide a rapid cycle separation process.

The present techniques may be used to design the adsorbent bed structure necessary to achieve a high purity gas separation using rapid cycle swing adsorption processes. The adsorbent bed structure may be represented by a particular combination of adsorbent layer structure and bed architecture. The bed architecture may include multiple parallel channels. The interior of the parallel channels may be coated with an adsorbent material and a binding material. This combination of materials may form a mixed matrix adsorbent layer with three distinct porous regions, such as i) the micropores within the zeolite crystal, ii) the mesopores within the binder material that surrounds the zeolite crystals and iii) the macropores that fill the remaining space in the layer.

For any kinetic separation, a disparity in the effective diffusivity of the species that are to be separated may be determined. For example, the separation may involve $CO_2$ adsorbing rapidly into an adsorbent material, such as DDR (e.g., ZSM-58) relative to $CH_4$ to separate the $CO_2$ from the $CH_4$. In the swing adsorption system, the adsorption bed configuration may involve designing or modeling an adsorbent layer, such that this kinetic selectivity is not masked by external mass transfer processes. The method may involve control of a figure of merit, which may be the Damkohler number, Da, which may be greater than 1 and preferably greater than 2 to provide fast diffusing species (e.g., $CO_2$). The Damkohler number may represent the ratio of the adsorption rate into the adsorbent layer to the convection rate along the channel, as shown in equations (e1) to (e3):

$$Da = \frac{N_i}{J_i} \quad (e1)$$

$$N_i = m_{ads} k_i^t \Delta q_i \quad (e2)$$

$$J_i = \frac{1000 p u A}{M_i} \quad (e3)$$

In the equations (e1) to (e3), $m_{ads}$ is the total mass of adsorbent, $k^t_i$ is the total adsorption rate constant of species i, $\Delta q_i$ is the adsorbent swing capacity of species i, $\rho$ is the gas density in the channel, u is the gas velocity in the channel, A is the channel cross-sectional area, $N_i$ is the total molar adsorption rate of species i, $J_i$ is the total molar flux of species i along the channel and $M_i$ is the molecular weight of species i. The total adsorption rate constant is a composite of the rate associated with four mass transfer mechanisms added in series of equations (e4) to (e8), as follows:

$$\frac{1}{k_i^t} = \left[ \frac{1}{k_{macro}^i} + \frac{1}{k_{meso}^i} + \frac{1}{k_{micro}^i} + \frac{1}{k_{film}^i} \right] \quad (e4)$$

$$k_{macro}^i = \frac{\varepsilon_{macro} D_m^i}{\tau l P} \quad (e5)$$

$$k_{meso}^i = \frac{D_k^i}{t P} \quad (e6)$$

$$k_{micro}^i = \frac{15 D_{ads}^i}{r_c^2} \quad (e7)$$

$$k_{film}^i = \frac{Sh_i D_m^i}{d_h P} \quad (e8)$$

In these equations (e4) to (e8), $\varepsilon_{macro}$ is the volume fraction of the adsorbent layer that is macro-voidage with pores greater than 500 Angstroms, $D^i_m$ is the molecular diffusion coefficient of species i in the mixture, $\tau$ is the tortuosity, l is the layer thickness, P is the gas channel cross-section perimeter, $D^i_k$ is the Knudsen diffusivity, t is the characteristic thickness of the meso-phase binder, $D^i_{ads}$ is the effective diffusivity of the adsorbent crystal, $r_c$ is the radius of the adsorbent crystal, $Sh_i$ is the Sherwood number for species i, $k^i_{macro}$ is the effective diffusion rate constant of species i through the macropores, $k^i_{meso}$ is the effective diffusion rate of species i through the mesopores, $k^i_{micro}$ is the effective diffusion rate of species i through the micropores, $k^i_{film}$ is the effective diffusion rate of species i through the gas film, $k^t_i$ is the total effective diffusion rate constant of species i and $d_h$ is the hydraulic diameter of the channel.

To fully specify the composite adsorption rate constant several correlations are necessary which depend on the details of the bed geometry. First, to specify the molecular diffusivity, the Fuller correlation is used, as in equation (e9):

$$d_m^i = 0.00143 \frac{(^2/_{M_i})^{0.5} T^{1.81}}{(2\gamma_i^{1/3})^2 P} \quad (e9)$$

where $\gamma_i$ is the atomic diffusion volume of species i. The Knudsen diffusivity is defined in equation (e10) as follows:

$$D_k^i = \frac{d_{pore}}{3} \left( \frac{8RT}{\pi M_i} \right)^{1/2} \quad (e10)$$

where $d_{pore}$ is as the diameter of the pore throats in the mesoporous binder phase, R is the ideal gas constant and T is the absolute temperature.

The mass transfer correlations for parallel channels are shown in equations (e11) to (e14) as follows:

$$Sh_i = B\left(1 + 0.0095\frac{d_k}{l}ReSc_i\right)^{0.45} \quad (e11)$$

$$Sc_i = \frac{\mu}{\rho D_m^i} \quad (e12)$$

$$Re = \frac{\rho d_h u}{\mu} \quad (e13)$$

$$B = 7.541(1 - 2.610a_r + 4.970a_r^2 - 5.119a_r^3 + 2.702a_r^4 - 0.548a_r^5) \quad (e14)$$

where $a_r$ is the aspect ratio of the channel and is less than 1 and $\mu$ is the gas viscosity.

In addition to the requirement on Damkohler number Da, the adsorbent bed pressure drop may be designed and/or maintained to be at less than 20%, and preferably less than 15%, of the overall swing adsorption system pressure drop (as measured in atmospheric pressure). This is to ensure that the flow through the adsorbent bed is controlled by the pressure drop through the valves that start and stop flow through the adsorbent bed. The adsorbent bed pressure drop may be calculated in equations (e15) to (e17) as follows:

$$\Delta P = LF_{drag}; \quad (e15)$$

$$F_{drag} = \frac{2Re\mu u}{d_k^2}\left\{\frac{24f_{ar}}{Re}\left[1 - \frac{1}{1 + \exp\left(-\frac{Re - 2100}{300}\right)}\right] + \frac{0.0791}{Re^{0.25}}\left[\frac{1}{1 + \exp\left(-\frac{Re - 2100}{300}\right)}\right]\right\} \quad (e16)$$

$$"f_{ar} = 1 - 1.3553 a_r + 1.9467 a_r^2 - 1.7012 a_r^3 + 0.9654 a_r^4 - 0.2537 a_r^5 \quad (e17)$$

Where L is the effective length of the adsorbent bed structure, $F_{drag}$ is the drag force, $f_{av}$ is the friction factor, $d_h$ is the hydraulic diameter and Re is the Reynolds number.

The design equations, which are noted in equations (e1) to (e17) may be used in a number of different approaches. Below are several examples that constitute typical use of the methodology. While this is not an exhaustive list, the complex algebraic nature of the system of equations may require numerical solution.

The generation of the swing adsorption configuration may include various steps. First, an adsorbent bed structure and adsorbent layer formulation may be identified. The method may include determining the optimum adsorbent layer thickness to achieve a specified separation. For example, an adsorbent bed structure may be defined by a method of construction (e.g. spiral wound), a cell density in cells per square inch (CPSI) and coating fraction (e.g., fraction of the available surface that is coated with adsorbent layer). The adsorbent layer formulation is the specific adsorbent type, size, and adsorption capacity, the binder type, size and adsorption capacity along with the volume fractions of adsorbent, binder, macro pores and meso pores. The specified separation may constitute the feed composition and preferred product composition as well as the overall desired throughput.

In another step in the generation of the swing adsorption configuration, an adsorbent bed structure, adsorbent material and coating thickness may be determined. The optimum layer formulation may be determined to achieve a specified separation. The optimum amount of binder and amount voidage (both absolute and relative) to achieve a specified separation may be determined. The use of the methodology may set targets for adsorbent layer development that are beyond what would normally be achieved and have resulted in significant experimental effort.

In yet another step in the generation of the swing adsorption configuration, an adsorbent layer formulation and layer thickness may be determined. The step may include a determination of the throughput for a specified separation in a swing adsorption process.

Further, an adsorbent layer formulation may be determined for an optimum adsorbent bed structure to achieve a specified separation in the swing adsorption process. This aspect may be used to balance between the adsorbent bed structure, adsorbent layer formulation and separation performance.

The present techniques may be a swing adsorption process, and specifically a rapid cycle adsorption process. The present techniques may include some additional equipment, such as one or more conduits and/or one or more manifolds that provide a fluid path for the cooling step and/or dampening system. In addition, other components and configurations may be utilized to provide the swing adsorption process, such as rapid cycle enabling hardware components (e.g., parallel channel adsorbent bed designs, rapid actuating valves, adsorbent bed configurations that integrate with other processes). Exemplary swing adsorption processes and configurations may include U.S. Patent Application Publication Nos. US2017/0056814, US2017/0113175 and US2017/0113173, and U.S. Pat. Nos. 10,080,991, 10,124, 286, 10,080,992 and 10,040,022, which are each incorporated by reference herein.

In one or more configurations, a swing adsorption process may include performing various steps. For the example, the present techniques may be used to remove contaminants from a gaseous feed stream with a swing adsorption process, which may be utilized with one or more downstream processes. The process comprising: a) performing a regeneration step (e.g., purge step), wherein the purge step comprises passing purge stream through an adsorbent bed unit to remove contaminants from an adsorbent bed within a housing of the adsorbent bed unit to form a purge product stream, which may be a heated purge stream; b) performing one or more adsorption steps, wherein each of the one or more adsorption steps comprise passing a gaseous feed stream through an adsorbent bed unit having an adsorbent bed to separate contaminants from the gaseous feed stream to form a product stream. In addition, the method may include determining whether the product stream and/or purge stream is within a temperature specification and/or composition specification; c) if the product stream is within the respective specification (e.g., is below a certain threshold), passing the product stream to a downstream process; and d) if the product stream is not within the specification (e.g., above a certain threshold), adjusting the swing adsorption system.

In other certain embodiments, the swing adsorption process may be integrated with downstream equipment and processes. The downstream equipment and processes may include control freeze zone (CFZ) applications, nitrogen removal unit (NRU), cryogenic NGL recovery applications, LNG applications, and other such applications. Each of these different applications may include different specifications for the feed stream in the respective process. For example, a cryogenic NGL process or an LNG process and may be integrated with the respective downstream equipment. As another example, the process may involve $H_2O$ and/or $CO_2$ removal upstream of a cryogenic NGL process or the LNG process and may be integrated with respective downstream equipment.

In certain configurations, the system utilizes a combined swing adsorption process, which combines TSA and PSA, for treating of pipeline quality natural gas to remove contaminants for the stream to satisfy LNG specifications. The swing adsorption process, which may be a rapid cycle process, is used to treat natural gas that is at pipeline specifications (e.g., a feed stream of predominately hydrocarbons along with less than or equal to about 2% volume $CO_2$ and/or less than or equal to 4 ppm $H_2S$) to form a stream satisfying the LNG specifications (e.g., less than 50 ppm $CO_2$ and less than about 4 ppm $H_2S$). The product stream, which may be the LNG feed stream, may have greater than 98 volume percent hydrocarbons based on the total volume of the product stream, while the $CO_2$ and water content are below certain thresholds. The LNG specifications and cryogenic NGL specifications may involve the $CO_2$ content to be less than or equal to 50 ppm, while the water content of the stream may be less than 0.1 ppm.

Moreover, the present techniques may include a specific process flow to remove contaminants, such as $CO_2$ and/or water. For example, the process may include an adsorbent step and a regeneration step, which form the cycle. The adsorbent step may include passing a gaseous feed stream at a feed pressure and feed temperature through an adsorbent bed unit to separate one or more contaminants from the gaseous feed stream to form a product stream. The feed stream may be passed through the adsorbent bed in a forward direction (e.g., from the feed end of the adsorbent bed to the product end of the adsorbent bed). Then, the flow of the gaseous feed stream may be interrupted for a regeneration step. The regeneration step may include one or more depressurization steps, one or more heating steps, and/or one or more purge steps. The depressurization steps, which may be or include a blowdown step, may include reducing the pressure of the adsorbent bed unit by a predetermined amount for each successive depressurization step, which may be a single step and/or multiple steps. The depressurization step may be provided in a forward direction or may preferably be provided in a countercurrent direction (e.g., from the product end of the adsorbent bed to the feed end of the adsorbent bed). The purge step may include passing a purge stream into the adsorbent bed unit, which may be a once through purge step and the purge stream may be provided in countercurrent flow relative to the feed stream. The purge stream may be provided at a purge temperature and purge pressure, which may include the purge temperature and purge pressure being similar to the heating temperature and heating pressure used in the heating step. Then, the cycle may be repeated for additional streams. Additionally, the process may include one or more re-pressurization steps after the purge step and prior to the adsorption step. The one or more re-pressurization steps may be performed, wherein the pressure within the adsorbent bed unit is increased with each re-pressurization step by a predetermined amount with each successive re-pressurization step. The cycle duration may be for a period greater than 1 second and less than 600 seconds, for a period greater than 2 second and less than 300 seconds, for a period greater than 2 second and less than 180 seconds, for a period greater than 5 second and less than 150 seconds or for a period greater than 5 second and less than 90 seconds.

In one or more embodiments, the present techniques can be used for any type of swing adsorption process. Non-limiting swing adsorption processes for which the present techniques may be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes. For example, the preferred swing adsorption process may include a combined pressure swing adsorption and temperature swing adsorption, which may be performed as a rapid cycle process. Exemplary swing adsorption processes are further described in U.S. Patent Publication Exemplary swing adsorption processes and configurations may include U.S. Patent Application Publication Nos. US2017/0056814, US2017/0113175 and US2017/0113173, and U.S. Pat. Nos. 10,080,991, 10,124,286, 10,080,992, 10,040,022, 7,959,720, 8,545,602, 8,529,663, 8,444,750, 8,529,662 and 9,358,493, which are each herein incorporated by reference in their entirety.

In one or more configurations, a method for fabricating a swing adsorption system to perform a swing adsorption process is described. The method comprising: identifying one or more contaminants to be removed from a swing adsorption process; identifying a feed contaminant range for a feed stream to the swing adsorption process; identifying a product contaminant threshold for a product stream from the swing adsorption process; identifying a range of flow rates for the feed stream passing through the swing adsorption process; determining an adsorbent bed configuration for each of the adsorbent bed units in the swing adsorption system, wherein the adsorbent bed configuration is configured to provide a sharp adsorption front during the swing adsorption process; generating a swing adsorption configuration based on the identified one or more contaminants, the range of flow rates and/or the determined adsorbent bed configuration, wherein the swing adsorption system comprises a plurality of adsorbent bed units, wherein each of the plurality of adsorbent bed units comprise an adsorbent bed structure that has a plurality of channels passing through an adsorbent material; and fabricating the swing adsorption system based on the swing adsorption configuration.

In another configuration, a method for performing a swing adsorption process is described. The method comprising: a) performing a swing adsorption cycle, wherein the swing adsorption cycle comprises performing an adsorption step that comprises passing a feed stream through an adsorbent bed unit having an adsorbent bed to separate one or more contaminants from the feed stream to form a product stream, wherein the adsorbent bed has an adsorbent material and has a bed structure, the adsorbent bed is fabricated based on a combination of a range of porosities of the adsorbent material; a range of adsorption isotherms for the adsorbent material; and a range of channel geometries; b) determining whether the product stream satisfies a product contaminant threshold; c) if the product stream does not satisfy the product contaminant threshold, repeating steps a) to b) for at least one additional swing adsorption cycle; and d) if the product stream satisfies the product contaminant threshold; conducting away the product stream from the process. In this method, the swing adsorption process may be based on a generated swing adsorption configuration, as noted in the configuration above.

In yet another configuration, a cyclical swing adsorption system is described. The cyclical swing adsorption system comprises: a plurality of manifolds, wherein the plurality of manifolds comprise a feed manifold configured to pass a feed stream to the plurality of adsorbent bed units during an adsorption step, a product manifold configured to pass a product stream from the plurality of adsorbent bed units during the adsorption step, a purge manifold configured to pass a purge stream to the plurality of adsorbent bed units during a regeneration step, and a purge product manifold configured to pass a purge product stream from the plurality of adsorbent bed units during the regeneration step; a plurality of adsorbent bed units coupled to the plurality of manifolds, each of the adsorbent bed units comprising: a housing; an adsorbent material disposed within the housing and the adsorbent material forming a bed structure, wherein the adsorbent bed is fabricated based on a combination of a range of porosities of the adsorbent material; a range of adsorption isotherms for the adsorbent material; and a range of channel geometries in the bed structure; a plurality of valves, wherein at least one of the plurality of valves is associated with one of the plurality of manifolds and is configured to manage fluid flow along a flow path extending between the respective manifold and the adsorbent material. In this system, the cyclical swing adsorption system, adsorption step and regeneration step may be based on a swing adsorption configuration, as noted in the configuration above.

In one or more configurations, the method or system may include various enhancements. The enhancements may include determining the adsorbent bed configuration comprises modeling the adsorbent bed based on i) a range of adsorbent porosities, ii) a range of adsorption isotherms for the adsorbent material, and iii) a range of channel geometries; determining whether the adsorbent bed configuration is configured to provide a sharp adsorption front comprises: calculating a ratio of an adsorption rate into the adsorbent layer to a convection rate along one of the plurality of the channels, and determining that the adsorption front is a sharp adsorption front when the ratio is greater than or equal to 1; wherein calculating a ratio of an adsorption rate into the adsorbent layer to a convection rate along one of the plurality of the channels comprises solving the following equation: $Da=N_i/J_i$, wherein Da is the Damkohler number, $N_i$ is the total molar adsorption rate of species i and $J_i$ is the total molar flow rate through the channels of species I; wherein determining the range of adsorbent porosities further comprises: determining a porosity of the adsorbent material, determining a porosity of a binder material, determining a porosity of a remaining material, and combining the porosity of the adsorbent material, the porosity of a binder material and the porosity of a remaining material to form the range of adsorbent porosities; wherein a combination of material forms a mixed matrix adsorbent layer with three distinct porous regions: the micropores within the zeolite crystal, the mesopores within the binder material that surrounds the zeolite crystals and the macropores that fill the remaining space in the layer; further comprising determining thickness of the adsorbent material based on a bed structure and an adsorbent layer formulation; wherein the bed structure comprises length of the adsorbent bed, diameter of the adsorbent bed, volume of the passages through the adsorbent bed; wherein the bed structure comprises determining a range of flow rates, and then a number of adsorbent beds required given a specific adsorbent isotherm, channel configuration and purity constraint; wherein the swing adsorption configuration comprises an adsorbent material thickness in a range between 10 microns and 100 microns, in a range between 20 microns and 80 microns, in a range between 20 microns and 50 microns; wherein the swing adsorption configuration comprises a cycle time for the swing adsorption process in a range between 10 seconds and 1,200 seconds; wherein the one or more contaminants include $H_2O$, $CO_2$, $H_2S$, $N_2$, ethane, and propane; wherein the one or more contaminants in the feed stream is $CO_2$ in a range between 5 mole percent to 60 mole percent, in a range between 5 mole percent and 30 mole percent, in a range between 5 mole percent and 20 mole percent, or in a range between 5 mole percent and 10 mole percent; and/or wherein the product contaminant threshold for a product stream is less than 50 parts per million volume of $CO_2$.

Further, in other configurations, the enhancements may include wherein the cycle duration is for a period greater than 1 second and less than 600 seconds or the cycle duration is greater than 2 seconds and less than 180 seconds; wherein the gaseous feed stream is a hydrocarbon containing stream having greater than one volume percent hydrocarbons based on the total volume of the feed stream; wherein the gaseous feed stream comprises hydrocarbons and $CO_2$, wherein the $CO_2$ content is in the range of two hundred parts per million volume and less than or equal to about 2% volume of the gaseous feed stream; wherein the swing adsorption process is configured to lower the carbon dioxide ($CO_2$) level to less than 50 parts per million; comprising passing the product stream to a downstream process; wherein the downstream process is a liquefied natural gas (LNG) process that comprises an LNG process unit or is a cryogenic natural gas liquefaction (NGL) process having a NGL process unit; and/or wherein the one or more contaminants in the feed stream is $CO_2$ in a range between 5 mole percent and 30 mole percent.

Moreover, in yet other configurations, the system may include various enhancements. The enhancements may include wherein the plurality of valves comprise one or more poppet valves; wherein plurality of manifolds, the plurality of adsorbent bed units are configured to operate at pressures between 0.1 bar absolute (bara) and 100 bara; comprising a liquefied natural gas (LNG) process that comprises an LNG process unit and is configured to receive the product stream; comprising a cryogenic natural gas liquefaction (NGL) process having a NGL process unit and is configured to receive the product stream; wherein the adsorbent material disposed within the housing and the adsorbent material forming a bed structure is based on a calculated ratio of an adsorption rate into the adsorbent layer to a convection rate along one of the plurality of the channels comprises solving the following equation: $Da=N_i/J_i$, wherein Da is the Damkohler number, $N_i$ is the total molar adsorption rate of species i and $J_i$ is the total molar flow rate through the channels of species i; wherein determining the range of adsorbent porosities further comprises: determining a porosity of the adsorbent material; determining a porosity of a binder material; determining a porosity of a remaining material; and/or combining the porosity of the adsorbent material, the porosity of a binder material and the porosity of a remaining material to form the range of adsorbent porosities.

Further still, in one or more configurations, a variety of adsorbent materials may be used to provide the mechanism for the separations. Examples include zeolite 3A, 4A, 5A, ZK4 and MOF-74. However, the process is not limited to these adsorbent materials, and others may be used as well. The present techniques may be further understood with reference to the FIGS. 1 to 7C below.

FIG. 1 is a three-dimensional diagram of the swing adsorption system 100 having six adsorbent bed units and interconnecting piping. While this configuration is a specific example, the present techniques broadly relate to adsorbent bed units that can be deployed in a symmetrical orientation and/or non-symmetrical orientation. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. In particular, the adsorbent bed units may include equipment, such as one or more heating units (not shown), one or more manifolds, which may be one of the manifolds 106, and one or more expanders, as noted further below. Further, the adsorbent bed unit may also include one or more equalization vessels, such as equalization vessel 108, which are dedicated to the adsorbent bed unit and may be dedicated to one or more step in the swing adsorption process. The equalization vessel 108 may be used to store the streams in one or more steps in the cycle.

As an example, which is discussed further below in FIG. 2, the adsorbent bed unit 102 may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
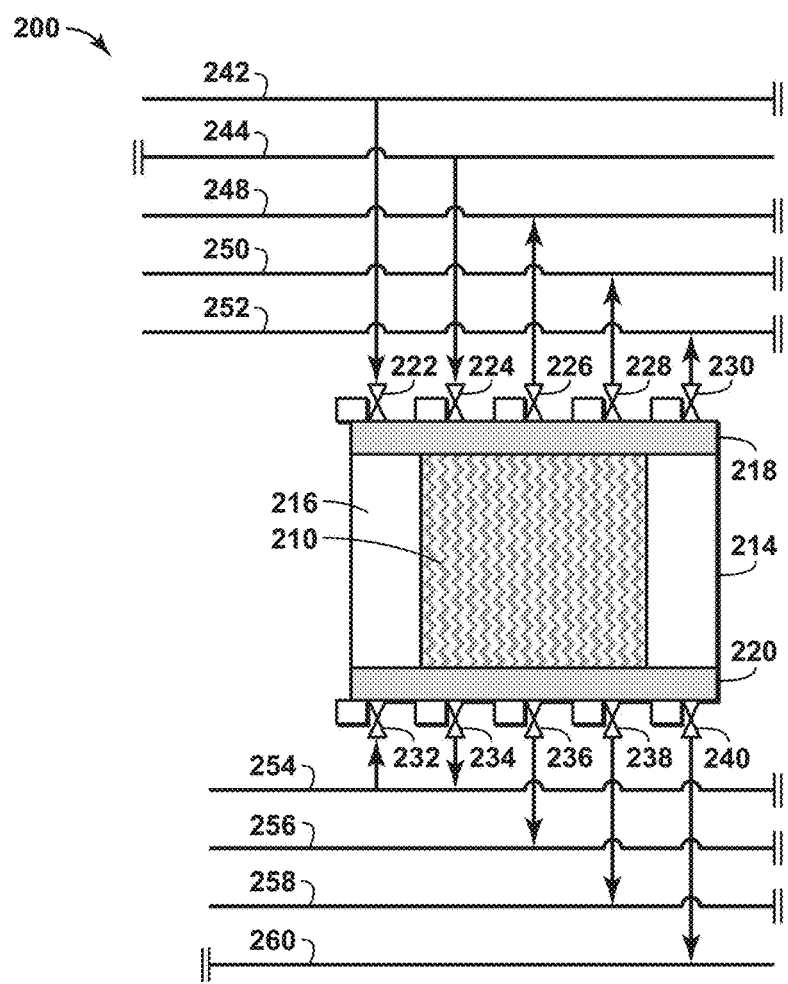
FIG. 2 is a diagram of a portion of an adsorbent bed unit having associated valve assemblies and manifolds in accordance with an embodiment of the present techniques.

FIG. 2 is a diagram of a portion of an adsorbent bed unit 200 having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure from 0 bara (bar absolute) or 0.1 bara to 150 bara within the interior region.

The upper head 218 and lower head 220 contain openings in which valve structures can be inserted, such as valve assemblies 222 to 240 (i.e., 222, 224, 226, 228, 230, 232, 234, 236, 238 and 240), respectively (e.g., poppet valves). The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow passages through the inlet manifolds 242 and 244 and the outlet manifolds 248, 250 and 252, while the lower head 220 contains various openings (not shown) to provide flow passages through the inlet manifold 254 and the outlet manifolds 256, 258 and 260. Disposed in fluid communication with the respective manifolds 242 to 260 are the valve assemblies 222 to 240. If the valve assemblies 222 to 240 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In swing adsorption processes, the cycle involves two or more steps that each has a certain time interval, which are summed together to be the cycle time or cycle duration. These steps include regeneration of the adsorbent bed following the adsorption step using a variety of methods including pressure swing, vacuum swing, temperature swing, purging (via any suitable type of purge fluid for the process), and combinations thereof. As an example, a PSA cycle may include the steps of adsorption, depressurization, purging, and re-pressurization. When performing the separation at high pressure, depressurization and re-pressurization (which may be referred to as equalization) may be performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

Further, one or more of the manifolds and associated valves may be utilized as a dedicated flow path for one or more streams. For example, during the adsorption or feed step, the manifold 242 and valve assembly 222 may be utilized to pass the feed gas stream to the adsorbent bed 210, while the valve assembly 236 and manifold 256 may be used to conduct away the product stream from the adsorbent bed 210. During the regeneration or purge step, the manifold 244 and valve assembly 224 may be utilized to pass the purge or heating stream to the adsorbent bed 210, while the valve assembly 236 and manifold 256 may be used to conduct away the purge product stream from the adsorbent bed 210. Further, the manifold 254 and valve assembly 232 may be utilized for a cooling stream, while the valve assembly 230 and manifold 252 may be used to conduct away the cooling product stream from the adsorbent bed 210. As may be appreciated, the purge stream and/or cooling stream may be configured to flow counter current to the feed stream in certain embodiments.

Alternatively, the swing adsorption process may involve sharing one or more of the manifolds and associated valves. Beneficially, this configuration may be utilized to lessen any additional valves or connections for adsorbent bed unit configurations that are subject to space limitations on the respective heads.

As noted above, the present techniques include various procedures that may be utilized for generating a swing adsorption system to perform a swing adsorption process. The present techniques may involve modeling the transition of different streams within the adsorbent bed units for a swing adsorption configuration between the steps in the cycle. The present techniques may include determining various features or settings for a swing adsorption configuration. For example, the present techniques may include identifying one or more contaminants to be removed from a swing adsorption process; identifying a feed contaminant range for a feed stream to the swing adsorption process; identifying a product contaminant threshold for a product stream from the swing adsorption process; identifying a range of flow rates for the feed stream passing through the swing adsorption process; determining a swing adsorption system configuration for the swing adsorption process, wherein the swing adsorption system may include specific settings for adsorbent bed configurations, which are configured to provide a sharp adsorption front. Then, the present techniques may include generating a representation of an swing adsorption configuration, which may include specific swing adsorbent beds, based on the identified one or more contaminants, the range of flow rates and/or the determined adsorbent bed configuration, wherein the adsorbent bed comprises an adsorbent bed structure that comprises a plurality of channels passing through the adsorbent bed and adsorbent material and fabricating the swing adsorption configuration, such as the individual adsorbent beds, based on the modeling. The determination of the swing adsorption configuration comprises modeling the adsorbent bed units based on i) a range of adsorbent porosities; ii) a range of adsorption isotherms for the adsorbent material; and iii) a range of channel geometries.

Figure 3:
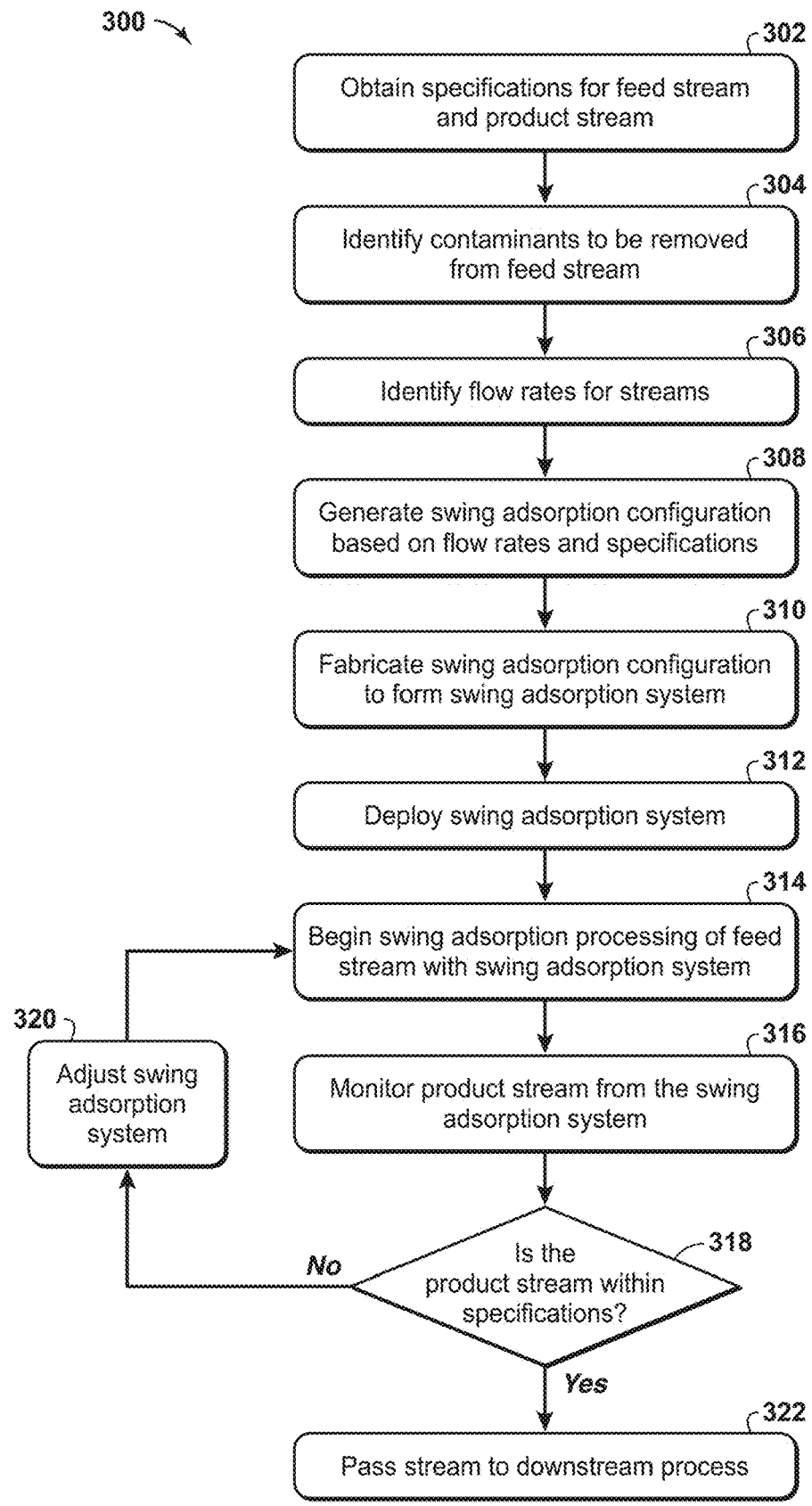
FIG. 3 is an exemplary flow chart for generating and using a swing adsorption process in accordance with an embodiment of the present techniques.

As an example, FIG. 3 is an exemplary flow chart for generating and using a swing adsorption process in accordance with an embodiment of the present techniques. In this flow chart 300, a swing adsorption system may be generated and fabricated to perform a swing adsorption process that may remove one or more contaminants from a feed stream. The flow chart 300 may include determining and fabricating a swing adsorption system, as shown in blocks 302 to 310 (i.e., 302, 304, 306, 308 and 310). Then, the swing adsorption system may be deployed and used to perform the swing adsorption process, which removes one or more contaminants from a feed stream and passed to the downstream equipment, as shown in blocks 312 to 322 (i.e., 312, 314, 316, 318, 320 and 322).

The process begins by determining and fabricating a swing adsorption system, as shown in blocks 302 to 310. At block 302, specifications are obtained for feed stream and product stream. The specifications may include identifying a feed contaminant range for a feed stream to the swing adsorption process; identifying a product contaminant threshold for a product stream from the swing adsorption process; and/or identifying a range of flow rates for the feed stream passing through the swing adsorption process. The specifications for the feed stream may include contaminants, such as water and $CO_2$. For example, the feed stream may include water content in a range between 10 parts per million (ppm) to 2,000 ppm or in a range between 50 parts per million (ppm) to 800 ppm, while the feed stream may include a $CO_2$ content in the range between 80 mole percent to 50 ppm. The specifications for the product stream may include water content less than 10 ppm, less than 5 ppm, less than 1 ppm, or less than 0.1 ppm and/or may include a $CO_2$ content less than 10 mol %, less than 2 mol % or less than 50 ppm. The feed stream may also include methane, propane, butane, nitrogen and other components that are substantially passed through the system. At block 304, one or more contaminants are identified to be removed from the feed stream. The one or more contaminants may be removed in an adsorption step, and the contaminants conducted away from the swing adsorption system in a regeneration step. The regeneration step may include one or more purge steps (e.g., passing the purge stream through the adsorbent bed units to create a purge product stream that is conducted away from the adsorbent bed units). The product purge stream may include the external stream and a portion of the contaminants within the adsorbent bed. At block 306, flow rates for the streams are identified. The identifying flow rates may include determining a range of flow rates for the feed stream passing through the swing adsorption process. The flow rates may include flow rates from 50 million standard cubic feet per day (mmscfd) to 800 mmscfd. At block 308, the swing adsorption configuration may be generated based on flow rates and specifications. The swing adsorption configuration may include two or more adsorbent bed units and each of the two or more adsorbent bed units may include an adsorbent bed configuration. The adsorbent bed configuration may be configured to provide a sharp adsorption front during the swing adsorption process. The adsorbent bed configuration may comprise modeling the adsorbent bed or adsorbent bed unit based on i) a range of adsorbent porosities; ii) a range of adsorption isotherms for the adsorbent material; and iii) a range of channel geometries. Also, the adsorbent bed configuration may be configured to provide a sharp adsorption front comprises: calculating a ratio of an adsorption rate into the adsorbent layer to a convection rate along one of the plurality of the channels; and determining that the adsorption front is a sharp adsorption front when the ratio is greater than or equal to 1. At block 310, the swing adsorption configuration may be used to fabricate the swing adsorption system. The fabrication of the swing adsorption system may include fabricating the adsorbent bed based on the adsorbent bed configuration, installing the adsorbent bed into an adsorbent bed unit, coupling conduits and/or manifolds to the adsorbent bed units in the swing adsorption system.

After being fabricated, the swing adsorption system may be deployed and used to perform the swing adsorption process, which removes one or more contaminants from a feed stream and passed to the downstream equipment, as shown in blocks 312 to 322. At block 312, the swing adsorption system may be deployed. The deployment of the swing adsorption system may involve fabricating an adsorbent bed based on the adsorbent bed configuration, assembling the adsorbent bed units (e.g., housing and adsorbent bed), coupling conduits and manifolds to the adsorbent bed units, and shipping the equipment and/or swing adsorption system to the location for performing the swing adsorption process. At block 314, the swing adsorption system may begin processing of the feed stream. The swing adsorption system may involve beginning swing adsorption process in a startup mode, which may be operated at reduced flow rates until operating properly and converted to normal mode. At block 316, the product stream from the swing adsorption system is monitored. The monitoring the product stream may be measured by a temperature sensor and/or a gas chromatograph or using another gas component analysis equipment. The product stream may also be measured by taking samples, using a moisture analyzer. Then, at block 318, a determination may be made whether the product stream is within the respective specification. The determination may include analyzing the product stream to determine the level of one or more of the contaminants is below the specification. If the product stream is within specification (e.g., contaminants are at or below a specific threshold), the product stream may be passed to downstream process, as shown in block 322. The downstream processes may include a CFZ process, a cryogenic NGL recovery process, or an LNG process, with the associated equipment for each. However, if the product stream is not within specifications, the product stream may be swing adsorption system may be adjusted, as shown in block 320. The adjustment of the swing adsorption system may include performing additional generation of a swing adsorption system in block 308 and/or adjusting the operation of the swing adsorption system.

Figure 4:
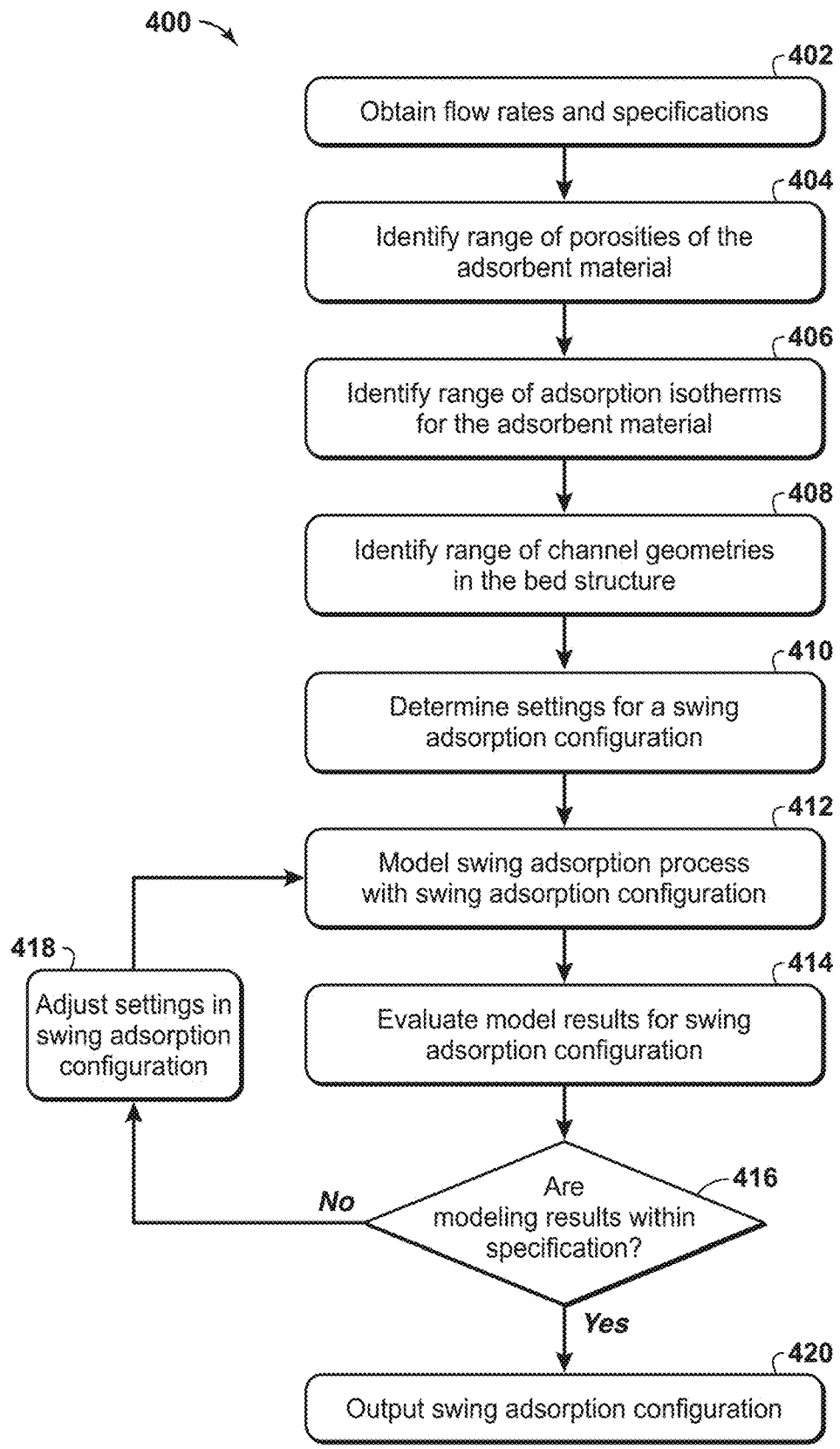
FIG. 4 is an exemplary flow chart for generating and modeling a swing adsorption process in accordance with an embodiment of the present techniques.

As an example, FIG. 4 is an exemplary flow chart for generating and modeling a swing adsorption process in accordance with an embodiment of the present techniques. In this flow chart 400, a swing adsorption system may be generated and modeled to perform a swing adsorption process that may remove one or more contaminants from a feed stream, which is a detailed version of generation in block 308 of FIG. 3. The flow chart 400 may include determining properties and settings for a swing adsorption system, as shown in blocks 402 to 410 (i.e., 402, 404, 406, 408 and 410). Then, the swing adsorption configuration may be modeled to simulate performance of the swing adsorption process, as shown in blocks 412 to 420.

The process begins by determining properties and settings for a swing adsorption system, as shown in blocks 402 to 410. At block 402, specifications and flow rates are obtained. The specifications and flow rates may be for various streams, such as the feed stream and product stream, which may be similar to the determinations in block 302 of FIG. 3. The specifications and flow rates may be adjusted to be settings for the modeling, which may be specific values or ranges of values. At block 404, a range of porosities of the adsorbent material are identified. The range of porosities in the adsorbent coating may be in the range between 20% and 80% or in a range between 30% and 50%. At block 406, a range of adsorption isotherms for the adsorbent material are identified. The identifying adsorption isotherms for the adsorbent material are described further below in FIGS. 7A to 7C. At block 408, a range of channel geometries in the bed structure are identified. The identifying channel geometries for the adsorbent bed structure may include square, round, trapezoidal, triangular, or rectangular shapes, which are described further in FIGS. 6A to 6C. At block 410, the settings for the swing adsorption configuration may be determined. The determination of the settings may include defining values for the modeling based on the obtained specifications and flow rates, identified range of porosities of the adsorbent material, identified range of adsorption isotherms for the adsorbent material, and/or identified range of channel geometries in the bed structure. The settings may be associated with individual swing adsorption configurations and/or a set of swing adsorption configurations.

Once the settings are determined, the swing adsorption configuration may be modeled to simulate performance of the swing adsorption process, as shown in blocks 412 to 420 (i.e., 412, 414, 416, 418 and 420). At block 412, the swing adsorption process with the swing adsorption configuration is modeled. The modeling of the swing adsorption configuration may include simulation of the time dependent bed loading, pressure and temperature during each stage of the swing adsorption process. The modeling of the swing adsorption process with the settings for the swing adsorption configuration is used to generate model results. The modeling may include performing the steps of simulating the time dependent coupled flow of fluid through the channels of the adsorption bed, and the adsorption of each species in the adsorbent coating, and the heat transfer within the adsorbent coating and bed structure. The model results may include the time dependent evolution of pressure, temperature, flow rate, and concentration in each process stream during every step in the swing adsorption process. At block 414, the model results for the swing adsorption configuration may be evaluated. The evaluation of the swing adsorption configurations may include determining an objective function, calculating a values of the objective function, and analyzing the objective function values to determine modifications to the swing adsorption configuration. Then, at block 416, a determination may be made whether the modeling results are within the respective specification. The determination may include analyzing the product stream in the modeling results to determine the level of one or more of the contaminants is below the specification. If the modeling results is within specification (e.g., contaminants are at or below a specific threshold), the swing adsorption configuration may be outputted, as shown in block 420. The outputting of the swing adsorption configuration may include storing the swing adsorption configuration and/or displaying the swing adsorption configuration. However, if the modeling results are not within specifications, the settings in the swing adsorption configuration may be adjusted, as shown in block 418. The adjustment of the swing adsorption configuration may include adjusting the settings, which may be based on the evaluation of the modeling results (e.g., objective function values or a notification based on the objective functions). Then, the modeling of the swing adsorption process with the swing adsorption configuration may be repeated with the adjusted settings.

In other configurations, the modeling of the swing adsorption process with the swing adsorption configuration may be repeated numerous times to generate a set of swing adsorption configurations. Then, the set of swing adsorption configurations may be ranked and evaluated against a predetermined set of criteria that may include product purity, total throughput and minimal energy consumption.

By way of example, the present techniques may include additional steps or mechanisms to model and generate a swing adsorption system associated with the transition of streams within the adsorbent beds between the steps in the swing adsorption cycle. In particular, the method may be used to fabricate and utilize the rapid cycle swing adsorption process, which is shown in FIGS. 5 to 7C.

Figure 5:
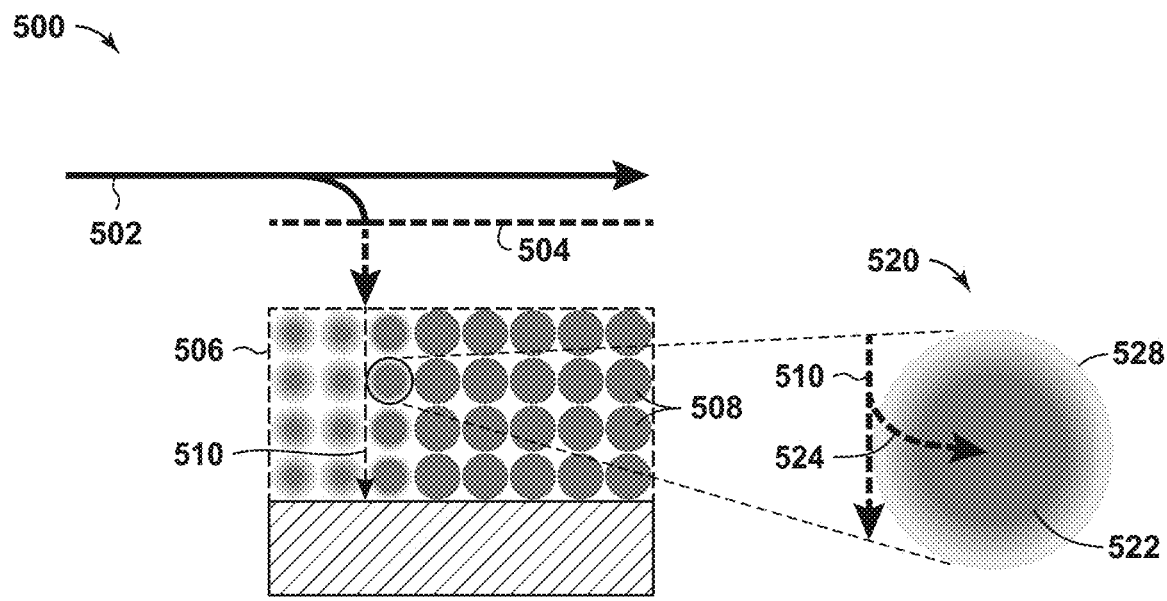
FIG. 5 is an exemplary diagram of the transport process used for generating a swing adsorption process in accordance with an embodiment of the present techniques.

FIG. 5 is an exemplary diagram 500 of the transport process used in generating a swing adsorption process in accordance with an embodiment of the present techniques. In this diagram 500, the feed stream gas flow passes through a passage, as shown along the arrow 502. A gas film forms between the line 504 and the adsorbent material, which is shown as a coating layer 506 that includes adsorbent particles 508. A portion of the feed stream passes into the coating layer 506, which is shown along arrow 510. An expanded view of this stream as it moves through coating layer 506 is shown in diagram 520. The stream, as shown along arrow 510, passes along the adsorbent particle 522. The contaminants from the stream interact with the absorbent particle 522 to form a contaminant layer 528, and the contaminants are adsorbed by the adsorbent particle as shown along arrow 524.

Figure 6A:
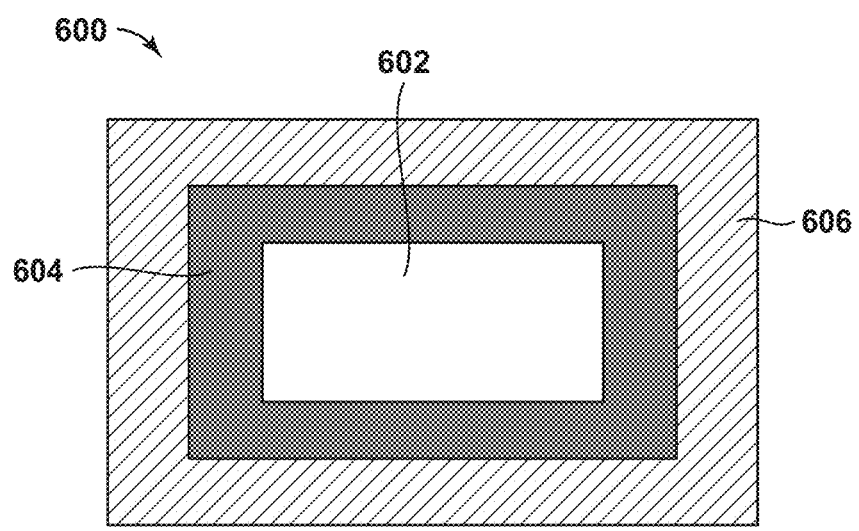
FIGS. 6A, 6B, and 6C are exemplary diagrams of channels used for generating a swing adsorption process in accordance with an embodiment of the present techniques.
Figure 6B:
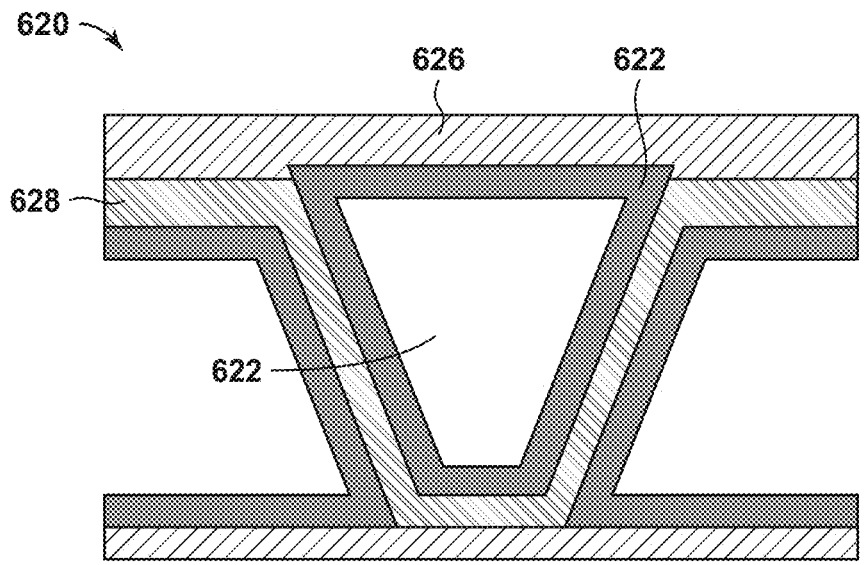
Figure 6C:
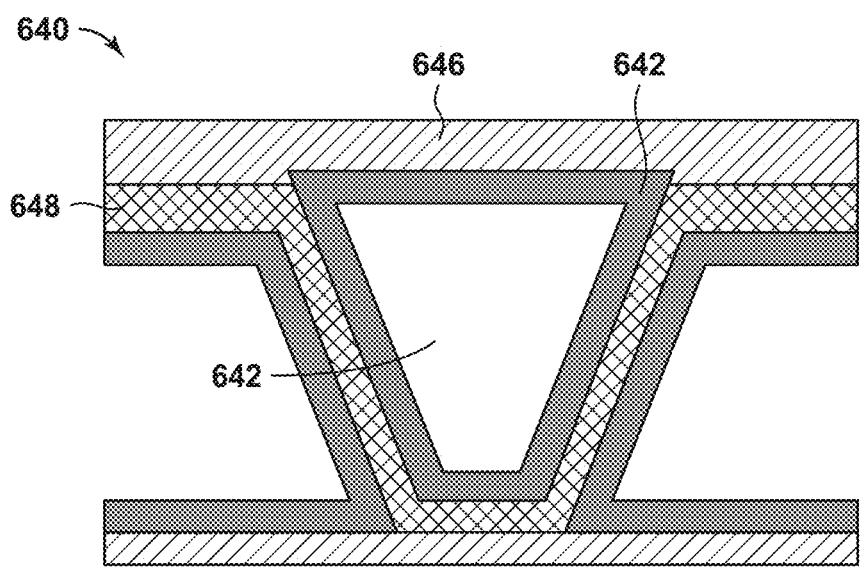

FIGS. 6A, 6B, and 6C are exemplary diagrams 600, 620, and 640 of channels used for generating a swing adsorption process in accordance with an embodiment of the present techniques. FIG. 6A is a diagram 600 of rectangular channel 602, which may be a foil cell. The rectangular channel has an adsorbent layer 604 that is disposed on some of the surfaces of the support structure 606. The adsorbent material may be disposed on each of the support structures forming the rectangular channel 602 or may be disposed on one or more of the support structures forming the rectangular channel 602.

FIG. 6B is a diagram 620 of trapezoidal channel 622, which may be a foil cell construction. The trapezoidal channel has an adsorbent layer 624 that is disposed on some of the surfaces of the foil cell 628 which may be optionally further supported by a separate support structure 626. The adsorbent material may be disposed on each of the foil cells forming the trapezoidal cell or channel 622 or may be disposed on one or more sheets of foil and forming the trapezoidal cell or channel 622.

FIG. 6C is a diagram 640 of trapezoidal channel 642, which may be a mesh cell construction. The trapezoidal channel has an adsorbent layer 644 that is disposed on some of the surfaces of the mesh cell 648 which may be optionally further supported by a separate support structure 646. The adsorbent material may be disposed on each of the mesh cells forming the trapezoidal cell or channel 642 or may be disposed on one or more sheets of mesh and forming the trapezoidal cell channel 642.

Figure 7A:
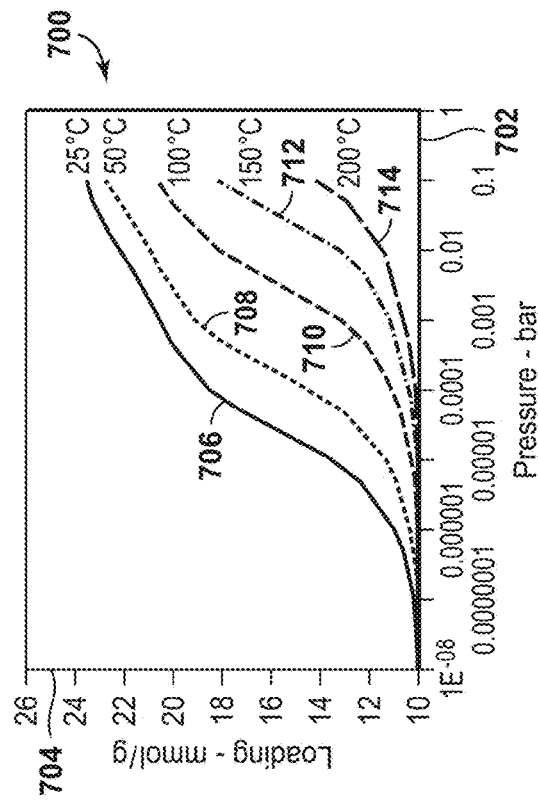
FIGS. 7A, 7B, and 7C are exemplary diagrams of isotherms used for generating a swing adsorption process in accordance with an embodiment of the present techniques.
Figure 7B:
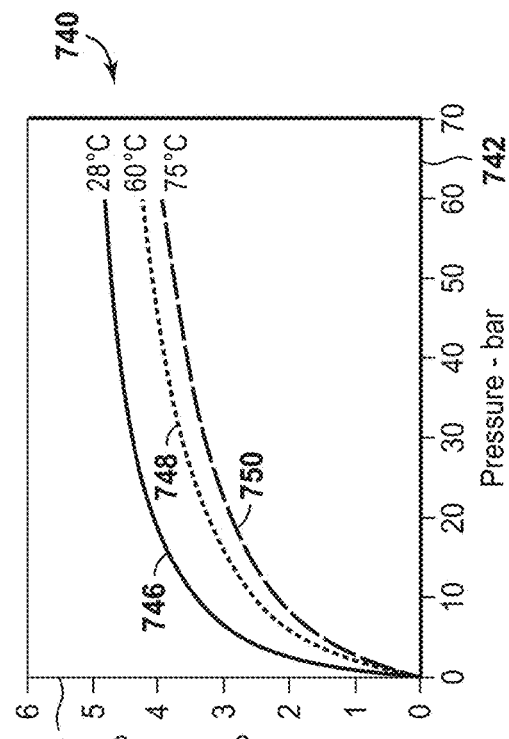
Figure 7C:
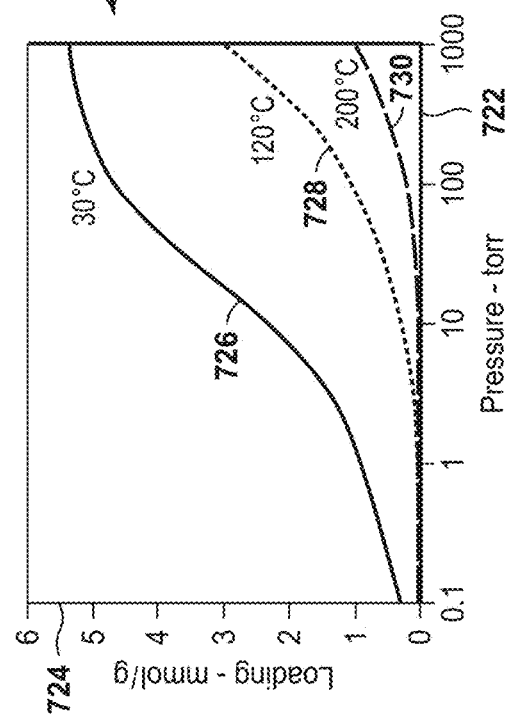

FIGS. 7A, 7B, and 7C are exemplary diagrams 700, 720, and 740 of isotherms used for generating a swing adsorption process in accordance with an embodiment of the present techniques. FIG. 7A is a diagram 700 of water ($H_2O$) isotherms for 3A adsorbent crystals. In this diagram 700, various responses 706, 708, 710, 712 and 714 are shown along a pressure axis 702 in bars and a loading axis 704 in milli-moles per gram (mmol/g). The response 706 is a water isotherm at 25° C., while the response 708 is a water isotherm at 50° C., the response 710 is a water isotherm at 100° C., the response 712 is a water isotherm at 125° C., and the response 714 is a water isotherm at 150° C. FIG. 7B and 7C are $CO_2$ and $CH_4$ isotherms, respectively, for 5A adsorbent crystals. FIG. 7B is a diagram 720 of carbon dioxide ($CO_2$) isotherms for 5A adsorbent crystals. In this diagram 720, various responses 726, 728 and 730 are shown along a pressure axis 722 in torr and a loading axis 724 in milli-moles per gram (mmol/g). The response 726 is a $CO_2$ isotherm at 30° C., while the response 728 is a $CO_2$ isotherm at 120° C., and the response 730 is a $CO_2$ isotherm at 200° C. FIG. 7C is a diagram 740 of methane ($CH_4$) isotherms for 5A adsorbent crystals. In this diagram 740, various responses 746, 748 and 750 are shown along a pressure axis 742 in bar and a loading axis 744 in milli-moles per gram (mmol/g). The response 746 is a $CH_4$ isotherm at 28° C., while the response 748 is a $CH_4$ isotherm at 60° C., and the response 750 is a $CH_4$ isotherm at 75° C.

In one or more embodiments, the material may include an adsorbent material supported on a non-adsorbent support. The adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups include primary, secondary, tertiary amines and other non protogenic basic groups such as amidines, guanidines and biguanides.

In one or more embodiments, the adsorbent bed unit may be utilized to separate contaminants from a feed stream. The method may include a) passing a gaseous feed stream at a feed pressure through an adsorbent bed unit having an adsorbent contactor to separate one or more contaminants from the gaseous feed stream to form a product stream, wherein the adsorbent contactor has a first portion and a second portion; b) interrupting the flow of the gaseous feed stream; performing a depressurization step, wherein the depressurization step reduces the pressure within the adsorbent bed unit; c) performing an optional heating step, wherein the heating step increases the temperature of the adsorbent bed unit to form a temperature differential between the feed end of the adsorbent bed and the product end of the adsorbent bed; and d) performing a cooling step, wherein the cooling step reduces the temperature within the adsorbent bed unit; e) performing a re-pressurization step, wherein the re-pressurization step increases the pressure within the adsorbent bed unit; and repeating the steps a) to e) for at least one additional cycle.

In one or more embodiments, when using RCTSA or an integrated RCPSA and RCTSA process, the total cycle times are typically less than 600 seconds, preferably less than 400 seconds, preferably less than 300 seconds, preferably less than 250 seconds, preferably less than 180 seconds, more preferably less than 90 seconds, and even more preferably less than 60 seconds. In other embodiment, the rapid cycle configuration may be operated at lower flow rates, which may result in the cycle durations being longer than the cycle durations. For example, the cycle duration may be extended to 1,000 seconds for some cycles.

EMBODIMENTS

Embodiment 1

A method for fabricating a swing adsorption system to perform a swing adsorption process, the method comprising:

a. identifying one or more contaminants to be removed from a swing adsorption process;
b. identifying a feed contaminant range for a feed stream to the swing adsorption process;
c. identifying a product contaminant threshold for a product stream from the swing adsorption process;
d. identifying a range of flow rates for the feed stream passing through the swing adsorption process;
e. determining an adsorbent bed configuration for each of the adsorbent bed units in the swing adsorption system, wherein the adsorbent bed configuration is configured to provide a sharp adsorption front during the swing adsorption process;
f. generating a swing adsorption configuration based on the identified one or more contaminants, the range of flow rates and/or the determined adsorbent bed configuration, wherein the swing adsorption system comprises a plurality of adsorbent bed units, wherein each of the plurality of adsorbent bed units comprise an adsorbent bed structure that has a plurality of channels passing through an adsorbent material; and
g. fabricating the swing adsorption system based on the swing adsorption configuration.

Embodiment 2

The method of claim 1, wherein determining the adsorbent bed configuration comprises modeling the adsorbent bed based on i) a range of adsorbent porosities; ii) a range of adsorption isotherms for the adsorbent material; and iii) a range of channel geometries.

Embodiment 3

The method of any one of claims 1 to 2, determining whether the adsorbent bed configuration is configured to provide a sharp adsorption front comprises:
calculating a ratio of an adsorption rate into the adsorbent layer to a convection rate along one of the plurality of the channels; and
determining that the adsorption front is a sharp adsorption front when the ratio is greater than or equal to 1.

Embodiment 4

The method of claim 3, wherein calculating a ratio of an adsorption rate into the adsorbent layer to a convection rate along one of the plurality of the channels comprises solving the following equation:

$$Da = N_i/J_i$$

wherein Da is the Damkohler number, $N_i$ is the total molar adsorption rate of species i and $J_i$ is the total molar flow rate through the channels of species i.

Embodiment 5

The method of claim 4, wherein calculating a ratio of an adsorption rate into the adsorbent layer to a convection rate along one of the plurality of the channels further comprises determining an effective diffusion rate constant of species i through the macropores, $k^i_{macro}$, an effective diffusion rate constant of species i through the mesopores, $k^i_{meso}$, an effective diffusion rate constant of species i through the micropores, $k^i_{micro}$, an effective diffusion rate constant of species i through the gas film, $k^i_{film}$, and a total effective diffusion rate constant, $k^i_t$.

Embodiment 6

The method of claim 4, wherein the pressure drop across at least one if the adsorbent bed unit ($\Delta P$) is determined by the following equations:

$$\Delta P = LF_{drag};$$

wherein:
L is equal to the effective length of the adsorbent bed structure, $$F_{drag} = \frac{2Re\mu u}{d_h^2}\left\{\frac{24f_{ar}}{Re}\left[1 - \frac{1}{1+\exp\left(-\frac{Re-2100}{300}\right)}\right] + \frac{0.0791}{Re^{0.25}}\left[\frac{1}{1+\exp\left(-\frac{Re-2100}{300}\right)}\right]\right\}, \text{ and}$$

$$1 - 1.3553\,a_r + 1.9467a_r^2 - 1.7012\,a_r^3 + 0.9654\,a_r^4 - 0.2537\,a_r^5.$$

Embodiment 7

The method of claim 6, wherein the pressure drop across at least one of the adsorbent bed units ($\Delta P$) is designed to be less than 20% of the overall system pressure drop of the swing adsorption system.

Embodiment 8

The method of claim 2, wherein determining the range of adsorbent porosities further comprises:
determining a porosity of the adsorbent material;
determining a porosity of a binder material;
determining a porosity of a remaining material; and
combining the porosity of the adsorbent material, the porosity of a binder material and the porosity of a remaining material to form the range of adsorbent porosities.

Embodiment 9

The method of claim 2, wherein a combination of material forms a mixed matrix adsorbent layer with three distinct porous regions: the micropores within the zeolite crystal, the mesopores within the binder material that surrounds the zeolite crystals and the macropores that fill the remaining space in the layer.

Embodiment 10

The method of claim 2, further comprising determining thickness of the adsorbent material based on a bed structure and an adsorbent layer formulation.

Embodiment 11

The method of claim 1, wherein the bed structure comprises length of the adsorbent bed, diameter of the adsorbent bed, volume of the passages through the adsorbent bed.

Embodiment 12

The method of claim 1, wherein the bed structure comprises determining a range of flow rates, and then a number of adsorbent beds required given a specific adsorbent isotherm, channel configuration and purity constraint.

Embodiment 13

The method of any one of claims 1 to 12, wherein the swing adsorption configuration comprises an adsorbent material thickness in a range between 10 microns and 100 microns.

Embodiment 14

The method of any one of claims 1 to 12, wherein the swing adsorption configuration comprises an adsorbent material thickness in a range between 20 microns and 80 microns.

Embodiment 15

The method of any one of claims 1 to 12, wherein the swing adsorption configuration comprises an adsorbent material thickness in a range between 20 microns and 50 microns.

Embodiment 16

The method of any one of claims 1 to 15, wherein the swing adsorption configuration comprises a cycle time for the swing adsorption process in a range between 10 seconds and 1,200 seconds.

Embodiment 17

The method of any one of claims 1 to 16, wherein the one or more contaminants include $H_2O$, $CO_2$, $H_2S$, $N_2$, ethane, and propane.

Embodiment 18

The method of claim 17, wherein the one or more contaminants in the feed stream is $CO_2$ in a range between 5 mole percent to 60 mole percent.

Embodiment 19

The method of claim 17, wherein the one or more contaminants in the feed stream is $CO_2$ in a range between 5 mole percent and 30 mole percent.

Embodiment 20

The method of claim 17, wherein the one or more contaminants in the feed stream is $CO_2$ in a range between 5 mole percent and 20 mole percent.

Embodiment 21

The method of claim 17, wherein the one or more contaminants in the feed stream is $CO_2$ in a range between 5 mole percent and 10 mole percent.

Embodiment 22

The method of any one of claims 1 to 21, wherein the product contaminant threshold for a product stream is less than 50 parts per million volume of $CO_2$.

Embodiment 23

A method for performing a swing adsorption process, the method comprising:

a. performing a swing adsorption cycle, wherein the swing adsorption cycle comprises performing an adsorption step that comprises passing a feed stream through an adsorbent bed unit having an adsorbent bed to separate one or more contaminants from the feed stream to form a product stream, wherein the adsorbent bed has an adsorbent material and has a bed structure, the adsorbent bed is fabricated based on a combination of a range of porosities of the adsorbent material; a range of adsorption isotherms for the adsorbent material; and a range of channel geometries;

b. determining whether the product stream satisfies a product contaminant threshold;

c. if the product stream does not satisfy the product contaminant threshold, repeating steps a) to b) for at least one additional swing adsorption cycle; and d. if the product stream satisfies the product contaminant threshold; conducting away the product stream from the process.

Embodiment 24

The method of claim 23, wherein the cycle duration is for a period greater than 1 second and less than 600 seconds.

Embodiment 25

The method of claim 23, wherein the cycle duration is greater than 2 seconds and less than 180 seconds.

Embodiment 26

The method of any one of claims 23 to 25, wherein the gaseous feed stream is a hydrocarbon containing stream having greater than one volume percent hydrocarbons based on the total volume of the feed stream.

Embodiment 27

The method of any one of claims 23 to 26, wherein the gaseous feed stream comprises hydrocarbons and $CO_2$, wherein the $CO_2$ content is in the range of two hundred parts per million volume and less than or equal to about 2% volume of the gaseous feed stream.

Embodiment 28

The method of any one of claims 23 to 27, wherein the swing adsorption process is configured to lower the carbon dioxide ($CO_2$) level to less than 50 parts per million.

Embodiment 29

The method of any one of claims 23 to 28, further comprising passing the product stream to a downstream process.

Embodiment 30

The method of claim 29, wherein the downstream process is a liquefied natural gas (LNG) process that comprises an LNG process unit.

Embodiment 31

The method of claim 29, wherein the downstream process is a cryogenic natural gas liquefaction (NGL) process that comprises a NGL process unit.

Embodiment 32

The method of any one of claims 23 to 31, wherein the swing adsorption process is based on the swing adsorption configuration of claim 1.

Embodiment 33

A cyclical swing adsorption system comprising:
a. a plurality of manifolds, wherein the plurality of manifolds comprise a feed manifold configured to pass a feed stream to the plurality of adsorbent bed units during an adsorption step, a product manifold configured to pass a product stream from the plurality of adsorbent bed units during the adsorption step, a purge manifold configured to pass a purge stream to the plurality of adsorbent bed units during a regeneration step, and a purge product manifold configured to pass a purge product stream from the plurality of adsorbent bed units during the regeneration step;
b. a plurality of adsorbent bed units coupled to the plurality of manifolds, each of the adsorbent bed units comprising:
  i. a housing;
  ii. an adsorbent material disposed within the housing and the adsorbent material forming a bed structure, wherein the adsorbent bed is fabricated based on a combination of a range of porosities of the adsorbent material; a range of adsorption isotherms for the adsorbent material; and a range of channel geometries in the bed structure;
  iii. a plurality of valves, wherein at least one of the plurality of valves is associated with one of the plurality of manifolds and is configured to manage fluid flow along a flow path extending between the respective manifold and the adsorbent material.

Embodiment 34

The cyclical swing adsorption system of claim 33, wherein the plurality of valves comprise one or more poppet valves.

Embodiment 35

The cyclical swing adsorption system of any one of claims 33 to 34, wherein plurality of manifolds, the plurality of adsorbent bed units are configured to operate at pressures between 0.1 bar absolute (bara) and 100 bara.

Embodiment 36

The cyclical swing adsorption system of any one of claims 33 to 35, further comprising a liquefied natural gas (LNG) process that comprises an LNG process unit and is configured to receive the product stream.

Embodiment 37

The cyclical swing adsorption system of any one of claims 33 to 36, further comprising a cryogenic natural gas liquefaction (NGL) process comprises a NGL process unit and is configured to receive the product stream.

Embodiment 38

The cyclical swing adsorption system of any one of the claims 33 to 37, wherein the adsorbent material disposed within the housing and the adsorbent material forming a bed structure is based on a calculated ratio of an adsorption rate into the adsorbent layer to a convection rate along one of the plurality of the channels comprises solving the following equation:

$$Da = N_i / J_i$$

wherein Da is the Damkohler number, $N_i$ is the total molar adsorption rate of species i and $J_i$ is the total molar flow rate through the channels of species i.

Embodiment 39

The cyclical swing adsorption system of claim 38, wherein determining the range of adsorbent porosities further comprises:
a. determining a porosity of the adsorbent material;
b. determining a porosity of a binder material;
c. determining a porosity of a remaining material; and
d. combining the porosity of the adsorbent material, the porosity of a binder material and the porosity of a remaining material to form the range of adsorbent porosities.

Embodiment 40

The cyclical swing adsorption system of any one of claims 33 to 39, wherein the cyclical swing adsorption system, adsorption step and regeneration step are based on the swing adsorption configuration of claim 1.

In view of the many possible embodiments to which the principles of the disclosed invention may be applied, it should be recognized that the illustrative embodiments are only preferred examples of the invention and should not be taken as limiting the scope of the invention.

What is claimed is:

1. A method for fabricating a swing adsorption system to perform a swing adsorption process, the method comprising:
   a. identifying one or more contaminants to be removed from a swing adsorption process;
   b. identifying a feed contaminant range for a feed stream to the swing adsorption process;
   c. identifying a product contaminant threshold for a product stream from the swing adsorption process;
   d. identifying a range of flow rates for the feed stream passing through the swing adsorption process;
   e. determining an adsorbent bed configuration for each of a plurality of adsorbent bed units in the swing adsorption system, each of the plurality of adsorbent bed units having an adsorbent bed structure, the adsorbent bed structure having a plurality of channels passing through an adsorbent material, the adsorbent material comprising an adsorbent layer in each of the plurality of channels, wherein the adsorbent bed configuration is configured to provide a sharp adsorption front during the swing adsorption process;
   f. generating a swing adsorption configuration based on the identified one or more contaminants, the range of flow rates and/or the determined adsorbent bed configuration; and g. fabricating the swing adsorption system based on the swing adsorption configuration;

wherein determining whether the adsorbent bed configuration is configured to provide the sharp adsorption front comprises:

calculating a ratio of an adsorption rate into the adsorbent layer to a convection rate along one of the plurality of the channels; and determining that the adsorption front is a sharp adsorption front when the ratio is greater than or equal to 1;

wherein calculating the ratio of the adsorption rate into the adsorbent layer to a convection rate along one of the plurality of the channels comprises solving the following equation (e1):

$$Da = \frac{N_i}{J_i} \quad (e1)$$

wherein Da is the Damkohler number, $N_i$ is the total molar adsorption rate of species i and $J_i$ is the total molar flow rate through the channels of species i;

wherein $N_i$ and $J_i$ are obtained according to the following equations (e2) and (e3):

$$N_i = m_{ads} k_t^i \Delta q_i \quad (e2)$$

$$J_i = \frac{1000 \rho u A}{M_i} \quad (e3)$$

wherein $m_{ads}$ is the total mass of adsorbent, $k^t_i$ is the total adsorption rate constant of species i, $\Delta q_i$, is the adsorbent swing capacity of species i, $\rho$ is the gas density in the channel, u is the gas velocity in the channel, A is the channel cross-sectional area, and $M_i$ is the molecular weight of species i;

wherein the total adsorption rate constant $k^t_i$ is a composite of the rate associated with four mass transfer mechanisms added in series of equations (e4) to (e8), as follows:

$$\frac{1}{k_t^i} = \left[\frac{1}{k_{macro}^i} + \frac{1}{k_{meso}^i} + \frac{1}{k_{macro}^i} + \frac{1}{k_{film}^i}\right] \quad (e4)$$

$$k_{macro}^i = \frac{\varepsilon_{macro} D_m^i}{\tau l P} \quad (e5)$$

$$k_{meso}^i = \frac{D_k^i}{t P} \quad (e6)$$

$$k_{micro}^i = \frac{15 D_{ads}^i}{r_c^2} \quad (e7)$$

$$k_{film}^i = \frac{Sh_t D_m^i}{d_h P} \quad (e8)$$

wherein $\varepsilon_{macro}$ is the volume fraction of the adsorbent layer that is macro-voidage with pores greater than 500 Angstroms, $D^i_m$ is the molecular diffusion coefficient of species i in the mixture, $\tau$ is the tortuosity, l is the layer thickness, P is the gas channel cross-section perimeter, $D^i_k$ is the Knudsen diffusivity, t is the characteristic thickness of the meso-phase binder, $D^i_{ads}$ is the effective diffusivity of the adsorbent crystal, $r_c$ is the radius of the adsorbent crystal, $Sh_i$ is the Sherwood number for species i, $k^i_{macro}$ is the effective diffusion rate constant of species i through the macropores, $k^i_{meso}$ is the effective diffusion rate of species i through the mesopores, $k^i_{micro}$ is the effective diffusion rate of species i through the micropores, $k^i_{film}$ is the effective diffusion rate of species i through the gas film, $k^t_i$ is the total effective diffusion rate constant of species i and $d_h$ is the hydraulic diameter of the channel;

wherein, a molecular diffusivity $d_m^i$ is defined, as in equation (e9):

$$d_m^i = 0.00143 \frac{(2/M_i)^{0.5}}{(2\gamma_i^{1/3})^2} \frac{T^{1.81}}{P} \quad (e9)$$

where $\gamma_i$ is the atomic diffusion volume of species i; and wherein the Knudsen diffusivity is defined in equation (e10) as follows:

$$D_k^i = \frac{d_{pore}}{3} \left(\frac{8RT}{\pi M_i}\right)^{1/2} \quad (e10)$$

where $d_{pore}$ is the diameter of the pore throats in the mesoporous binder phase, R is the ideal gas constant and T is the absolute temperature.

2. The method of claim 1, wherein determining the adsorbent bed configuration comprises modeling the adsorbent bed based on i) a range of adsorbent porosities; ii) a range of adsorption isotherms for the adsorbent material; and iii) a range of channel geometries.

3. The method of claim 2, wherein a pressure drop across at least one of the adsorbent bed units ($\Delta P$) is determined by the following equations:

$$\Delta P = L F_{drag};$$

wherein:

L is equal to the effective length of the adsorbent bed structure, $$F_{drag} = \frac{2 Re \mu u}{d_h^2} \left\{ \frac{24 f_{ar}}{Re} \left[1 - \frac{1}{1+\exp\left(-\frac{Re-2100}{300}\right)}\right] + \frac{0.0791}{Re^{0.25}}\left[\frac{1}{1+\exp\left(-\frac{Re-2100}{300}\right)}\right]\right\}$$

$$1 - 1.3553 a_r + 1.9467 a_r^2 - 1.7012 a_r^3 + 0.9654 a_r^4 - 0.2537 a_r^5,$$

$f_{ar} = 1 - 1.3553 a_r + 1.9467 a_r^2 - 1.7012 a_r^3 + 0.9654 a_r^4 - 0.2537 a_r^5$, wherein $a_r$ is the aspect ratio of the channel and is less than 1.

4. The method of claim 3, wherein the pressure drop across at least one of the adsorbent bed units ($\Delta P$) is designed to be less than 20% of the overall system pressure drop of the swing adsorption system.

5. The method of claim 2, wherein determining the range of adsorbent porosities further comprises:

determining a porosity of the adsorbent material;
determining a porosity of a binder material;
determining a porosity of a remaining material; and
combining the porosity of the adsorbent material, the porosity of a binder material and the porosity of a remaining material to form the range of adsorbent porosities.

6. The method of claim 2, wherein a combination of material forms a mixed matrix adsorbent layer with three distinct porous regions: the micropores within the zeolite crystal, the mesopores within the binder material that surrounds the zeolite crystals and the macropores that fill the remaining space in the adsorbent layer.

7. The method of claim 2, further comprising determining thickness of the adsorbent material based on the adsorbent bed structure and an adsorbent layer formulation, wherein the adsorbent bed structure comprises length of the adsorbent bed, diameter of the adsorbent bed, volume of the passages through the adsorbent bed.

8. The method of claim 1, wherein the adsorbent bed structure comprises determining a range of flow rates, and then a number of adsorbent beds required given a specific adsorbent isotherm, channel configuration and purity constraint.

9. The method of claim 1, wherein the swing adsorption configuration comprises an adsorbent material thickness in a range between 10 microns and 100 microns.

10. The method of claim 1, wherein the swing adsorption configuration comprises a cycle time for the swing adsorption process in a range between 10 seconds and 1,200 seconds.

11. The method of claim 1, wherein the one or more contaminants include $H_2O$, $CO_2$, $H_2S$, $N_2$, ethane, and propane.

12. The method of claim 11, wherein the one or more contaminants in the feed stream is $CO_2$ in a range between 5 mole percent to 60 mole percent and the product contaminant threshold for a product stream is less than 50 parts per million volume of $CO_2$.

* * * * *